(12) United States Patent (10) Patent No.: US 10,976,865 B2
Lee et al. (45) Date of Patent: Apr. 13, 2021

(54) TOUCH DISPLAY PANEL, TOUCH DISPLAY DEVICE, AND DRIVING METHOD THEREOF

(71) Applicant: LG DISPLAY CO., LTD., Seoul (KR)

(72) Inventors: HwiDeuk Lee, Gyeongsangbuk-do (KR); Sangkyu Kim, Gyeonggi-do (KR); Taeyun Kim, Gyeonggi-do (KR); Yangsik Lee, Gyeonggi-do (KR); Jaeseung Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/517,163

(22) Filed: Jul. 19, 2019

(65) Prior Publication Data
US 2020/0026408 A1 Jan. 23, 2020

(30) Foreign Application Priority Data

Jul. 20, 2018 (KR) .......................... 10-2018-0084545

(51) Int. Cl.
*G06F 3/041* (2006.01)
*G06F 3/044* (2006.01)
*G06F 3/0354* (2013.01)
*G06F 3/038* (2013.01)

(52) U.S. Cl.
CPC ........ *G06F 3/04182* (2019.05); *G06F 3/0383* (2013.01); *G06F 3/03545* (2013.01); *G06F 3/0412* (2013.01); *G06F 3/0443* (2019.05); *G06F 2203/04114* (2019.05)

(58) Field of Classification Search
CPC .. G06F 3/03545; G06F 3/0383; G06F 3/0412; G06F 3/04166; G06F 3/0418; G06F 3/04182; G06F 3/04184; G06F 3/044; G06F 3/0443; G06F 3/0446; G06F 2203/04114

See application file for complete search history.

(56) References Cited

U.S. PATENT DOCUMENTS

| 2011/0050624 A1* | 3/2011 | Lee .......................... G06F 3/045 345/174 |
| 2015/0212643 A1* | 7/2015 | Lee ........................ G06F 3/0416 345/174 |
| 2018/0039372 A1* | 2/2018 | Cho ....................... G06F 3/0412 |

(Continued)

FOREIGN PATENT DOCUMENTS

| EP | 3 410 273 A1 | 12/2018 |
| JP | 2017-4482 A | 1/2017 |

(Continued)

*Primary Examiner* — Nelson M Rosario
(74) *Attorney, Agent, or Firm* — Birch, Stewart, Kolasch & Birch LLP

(57) ABSTRACT

Discussed are a touch display panel, a touch display device, and a driving method thereof, wherein a constant voltage is applied to a cathode electrode during a period for sensing a finger touch or a pen touch, thereby performing touch sensing while performing display driving. In addition, a signal having the same phase and potential as the signal applied to the touch electrode is applied to the cathode electrode during a period for transmitting an uplink signal to the pen, thereby eliminating parasitic capacitance between the touch electrode and the cathode electrode, preventing transmission delay of the uplink signal, improving the recognition rate of the uplink signal, and enhancing the performance of pen-touch sensing.

22 Claims, 20 Drawing Sheets

(56) References Cited

U.S. PATENT DOCUMENTS

| | | |
|---|---|---|
| 2018/0113559 A1 | 4/2018 | Bae et al. |
| 2018/0120962 A1 | 5/2018 | Hara et al. |
| 2018/0181241 A1 | 6/2018 | Jung et al. |
| 2018/0196573 A1 | 7/2018 | Kang et al. |

FOREIGN PATENT DOCUMENTS

| | | |
|---|---|---|
| JP | 2017-130212 A | 7/2017 |
| JP | 2015-106600 A | 7/2018 |
| JP | 2015-109963 A | 7/2018 |
| TW | 201737047 A | 10/2017 |
| TW | 201826096 A | 7/2018 |

* cited by examiner

TOUCH DISPLAY PANEL, TOUCH DISPLAY DEVICE, AND DRIVING METHOD THEREOF

CROSS REFERENCE TO RELATED APPLICATION

This application claims priority from Korean Patent Application No. 10-2018-0084545, filed on Jul. 20, 2018, in the Republic of Korea, which is hereby incorporated by reference for all purposes as if fully set forth herein.

BACKGROUND OF THE INVENTION

1. Field of the Invention

Embodiments of the present disclosure relate to a touch display panel, a touch display device, and a method for driving the same.

2. Description of the Background Art

The advent of the information society has brought growing demands for display devices for displaying images, and various types of display devices, such as a liquid crystal display device, an organic light-emitting display device, or the like, are being utilized.

In order to provide a variety of functions to users, display devices provide functions of recognizing a finger touch or a pen touch on the display panel and performing an input process on the basis of the recognized touch.

For example, a display device capable of recognizing a touch can include a plurality of touch electrodes arranged on or embedded in a display panel, and can drive the touch electrodes, thereby detecting whether or not a user's touch is performed, touch coordinates, and the like on the display panel.

However, since the display panel providing the above touch recognition function have electrodes or signal lines arranged thereon so as to be applied with various voltages and signals for driving the display, the parasitic capacitance produced between the display electrodes and the touch electrodes can degrade touch sensing performance.

SUMMARY OF THE INVENTION

It is an aspect of the embodiments of the present disclosure to provide a touch display panel, a touch display device, and a driving method thereof, which can reduce the influence of parasitic capacitance, produced by electrodes and the like arranged in the panel for driving a display, on touch driving.

It is another aspect of the embodiments of the present disclosure to provide a touch display panel, a touch display device, and a driving method thereof, which can increase the recognition rate for signals transmitted and received between the panel and a pen when sensing a pen touch on the panel.

According to one aspect, the embodiments of the present disclosure can provide a touch display device including: a panel having a plurality of gate lines, a plurality of data lines, and a plurality of subpixels arranged thereon; a plurality of touch electrodes arranged on or embedded in the panel; a display electrode embedded in the panel and positioned below the plurality of touch electrodes; and a touch driving circuit configured to drive the plurality of touch electrodes.

In the touch display device, the touch driving circuit can output, to at least some of the plurality of touch electrodes, a first touch-driving signal during a first touch-driving period and a second touch-driving signal during a second touch-driving period.

In addition, the display electrode can be applied with a constant voltage during the first touch-driving period, and can be applied with a signal corresponding to the second touch-driving signal during the second touch-driving period.

The touch display device can be driven by a method including: applying a first touch-driving signal to at least some of a plurality of touch electrodes during a first touch-driving period; applying a constant voltage to a display electrode during the first touch-driving period; applying a second touch-driving signal to at least some of the plurality of touch electrodes during a second touch-driving period; and applying a signal corresponding to the second touch-driving signal to the display electrode during the second touch-driving period.

According to another aspect, the embodiments of the present disclosure can provide a touch display panel including: a substrate; a plurality of signal lines arranged on the substrate; a signal-line-insulating layer arranged on the plurality of signal lines; a plurality of first electrodes arranged on the signal-line-insulating layer; a plurality of organic light-emitting layers arranged on respective ones among the plurality of first electrodes; a second electrode arranged on the plurality of organic light-emitting layers; an encapsulation portion arranged on the second electrode; and a plurality of touch electrodes arranged on the encapsulation portion.

According to another aspect, the embodiments of the present disclosure can provide a touch display device including a substrate having an active area and a non-active area; a plurality of gate lines, a plurality of data lines, and a plurality of subpixels arranged on the substrate, wherein each of the plurality of subpixels includes a first electrode, an organic light emitting layer on the first electrode, and a second electrode on the organic light emitting layer; an encapsulation layer on the second electrode; a plurality of touch electrodes on the encapsulation layer; a plurality of the touch routing lines electrically connected to the plurality of touch electrodes, wherein the plurality of touch routing lines are disposed along an inclined surface of the encapsulation layer, and an electrically connected to a plurality of touch pads disposed in the non-active area; and a touch driving circuit configured to drive the plurality of touch electrodes, wherein the touch driving circuit outputs a first touch-driving signal during a first touch-driving period, and a second touch-driving signal during a second touch-driving period to at least some of the plurality of touch electrodes, and wherein the second electrode is applied with a constant voltage during the first touch-driving period and is applied with a signal corresponding to the second touch-driving signal during the second touch-driving period.

According to another aspect, the embodiments of the present disclosure can provide a method of driving a touch display device including applying a first touch-driving signal to at least some of a plurality of touch electrodes and a constant voltage to a display electrode during a first touch-driving period; and applying a second touch-driving signal to at least some of the plurality of touch electrodes and a signal corresponding to the second touch-driving signal to the display electrode during a second touch-driving period.

In the touch display panel, at least some of the plurality of touch electrodes can be applied with a first touch-driving signal during a first touch-driving period, and can be applied with a second touch-driving signal during a second touch-driving period. In addition, the second electrode can be applied with a constant voltage during the first touch-driving period, and can be applied with a signal corresponding to the second touch-driving signal during the second touch-driving period.

According to the embodiments of the present disclosure, it is possible to reduce or eliminate the parasitic capacitance between a touch electrode and a display electrode by applying a signal corresponding to a touch-driving signal to a display electrode adjacent to a touch electrode during a period in which a panel transmits an uplink signal for pen-touch sensing.

By removing the parasitic capacitance between the touch electrode and the display electrode as described above, it is possible to prevent the transmission delay of an uplink signal due to the parasitic capacitance and to improve the recognition rate for the transmitted uplink signal, thereby enhancing the performance of pen-touch sensing.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Figure 1:
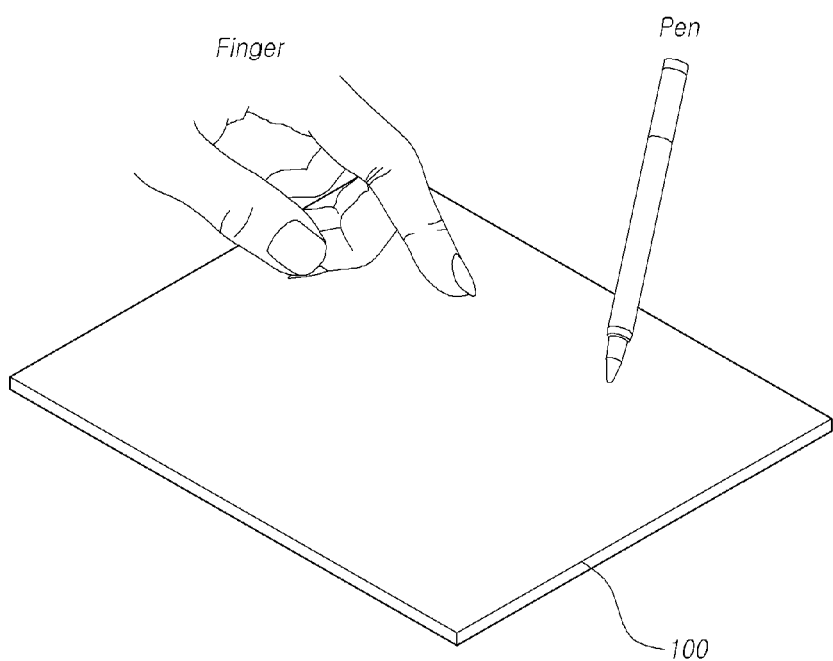
FIG. 1 is a view illustrating an example of a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it can make the subject matter of the present disclosure rather unclear.

In addition, terms, such as first, second, A, B, (a), (b) or the like can be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element can "be connected to", "be coupled to", or "be in contact with" the structural elements as well as that the certain structural element is directly connected to or is in direct contact with another structural element.

FIG. 1 is a view illustrating an example of a touch display device 100 according to embodiments of the present disclosure.

Referring to FIG. 1, the touch display device 100 according to the embodiments of the present disclosure can provide a function of sensing a touch by a finger, a pen, or the like, as well as a function of displaying images.

The "pen" can have a signal transmission/reception function, can interwork with the touch display device 100, or can be an active pen having its own power source, but the pen is not limited thereto.

The touch display device 100 according to embodiments of the present disclosure can be, for example, a television (TV), a monitor, or the like, or can be a mobile device such as a tablet PC, a smart phone, or the like.

The touch display device 100 according to embodiments of the present disclosure can include a display part for providing an image displaying function and a touch sensing part for providing a touch sensing function.

Figure 2:
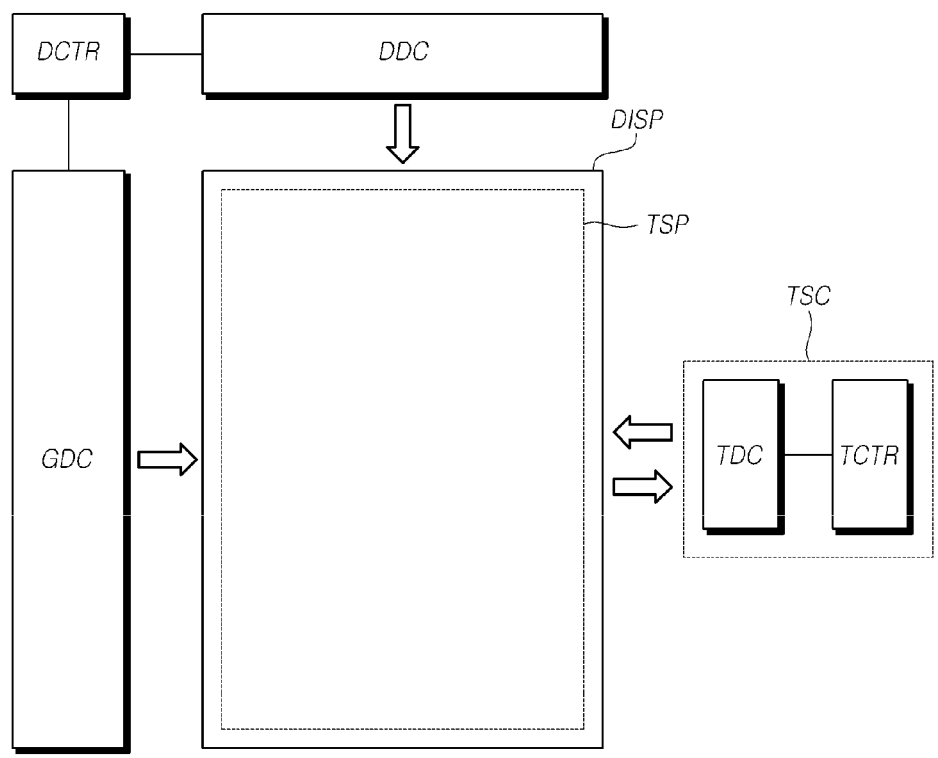
FIG. 2 is a view schematically illustrating the configuration of a touch display device according to embodiments of the present disclosure.

FIG. 2 is a view schematically illustrating the system configuration of a touch display device 100 according to embodiments of the present disclosure.

Referring to FIG. 2, a touch display device 100 according to embodiments of the present disclosure can provide both a function for displaying an image and a function for touch sensing.

In order to provide an image displaying function, the touch display device 100 according to embodiments of the present disclosure can include a display panel (DISP) on which a plurality of data lines and a plurality of gate lines are arranged and on which a plurality of subpixels defined by the plurality of data lines and the plurality of gate lines are arranged, a data driving circuit (DDC) for driving the plurality of data lines, a gate driving circuit (GDC) for driving the plurality of gate lines, and a display controller (DCTR) for controlling operations of the data driving circuit (DDC) and the gate driving circuit (GDC).

Each of the data driving circuit (DDC), the gate driving circuit (GDC), and the display controller (DCTR) can be implemented as one or more discrete components. In some cases, two or more of the data driving circuit (DDC), the gate driving circuit (GDC), and the display controller (DCTR) can be integrated into a single component. For example, the data driving circuit (DDC) and the display controller (DCTR) can be implemented as a single integrated circuit chip (IC Chip).

In order to provide a touch sensing function, the touch display device 100 according to embodiments of the present disclosure can include a touch panel (TSP) including a plurality of touch electrodes and a touch sensing circuit (TSC) for supplying a touch-driving signal to the touch panel (TSP), detecting a touch-sensing signal from the touch panel (TSP), and sensing whether or not a user's touch is performed or a touch position (touch coordinates) on the touch panel (TSP) on the basis of the detected touch-sensing signal.

The touch sensing circuit (TSC), for example, can include a touch driving circuit (TDC) for supplying a touch-driving signal to the touch panel (TSP) and detecting a touch-sensing signal from the touch panel (TSP) and a touch controller (TCTR) for sensing whether or not a user's touch is performed and/or a touch position on the touch panel (TSP) on the basis of the touch-sensing signal detected by the touch driving circuit (TDC).

The touch driving circuit (TDC) can include a first circuit part for supplying a touch-driving signal to the touch panel (TSP) and a second circuit part for detecting a touch-sensing signal from the touch panel (TSP).

The touch driving circuit (TDC) and the touch controller (TCTR) can be implemented as separate components, or in some cases, can be integrated into a single component.

Each of the data driving circuit (DDC), the gate driving circuit (GDC), and the touch driving circuit (TDC) can be implemented as one or more integrated circuits and, in terms of electrical connection with the display panel (DISP), can be implemented as a chip-on-glass (COG) type, a chip-on-film (COF) type, a tape carrier package (TCP) type, and the like. The gate driving circuit (GDC) can also be implemented as a gate-in-panel (GIP) type.

The respective circuit configurations (DDC, GDC, and DCTR) for display driving and the respective circuit configurations (TDC and TCTR) for touch sensing can be implemented as one or more discrete components. In some cases, one or more of the circuit configurations (DDC, GDC, and DCTR) for display driving and the circuit configurations (TDC and TCTR) for touch sensing can be functionally integrated into one or more components.

For example, the data driving circuit (DDC) and the touch driving circuit (TDC) can be integrated into one or more integrated circuit chips. In the case where the data driving circuit (DDC) and the touch driving circuit (TDC) are integrated into two or more integrated circuit chips, the two or more integrated circuit chips can have a data driving function and a touch driving function, respectively.

The touch display device 100 according to embodiments of the present disclosure can be various types of display devices such as an organic light-emitting display device, a liquid crystal display device, or the like. Hereinafter, for the convenience of explanation, a description will be made of an example in which the touch display device 100 is an organic light-emitting display device. That is, although the display panel (DISP) can be any of various types of display panels, such as an organic light-emitting display panel, a liquid crystal display panel, or the like, the following description will be made on the basis of an example in which the display panel (DISP) is an organic light-emitting display panel for the convenience of explanation.

As will be described later, the touch panel (TSP) can include a plurality of touch electrodes, to which a touch-driving signal is applied or from which a touch-sensing signal is detected, and a plurality of touch routing lines for connecting the plurality of touch electrodes to the touch driving circuit (TDC).

The touch panel (TSP) can be provided outside the display panel (DISP). That is, the touch panel (TSP) and the display panel (DISP) can be separately manufactured and combined with each other. Such a touch panel (TSP) is referred to as an "external type" or "add-on type" touch panel.

Alternatively, the touch panel (TSP) can be embedded in the display panel (DISP). That is, a touch sensor structure, such as a plurality of touch electrodes, a plurality of touch routing lines, and the like, constituting the touch panel (TSP) can be folioed together with electrodes and signal lines for driving the display when manufacturing the display panel (DISP). Such a touch panel (TSP) is called an "embedded-type touch panel". Hereinafter, for the convenience of explanation, the embedded-type touch panel (TSP) will be described by way of example.

Figure 3:
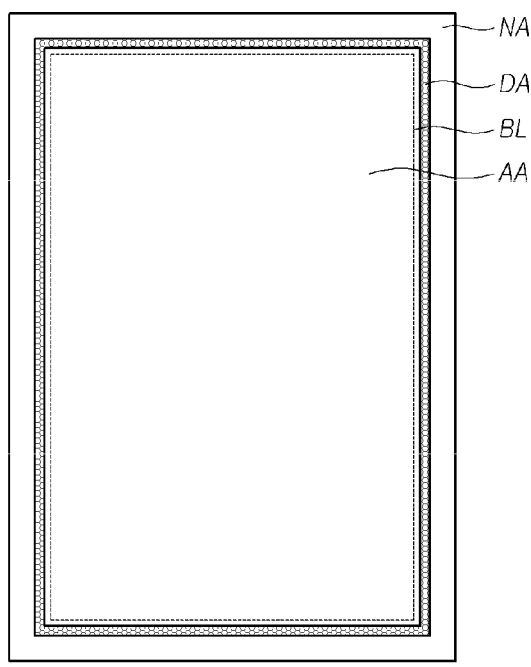
FIG. 3 is a view schematically illustrating a display panel of a touch display device according to embodiments of the present disclosure.

FIG. 3 is a view schematically illustrating a display panel (DISP) of a touch display device 100 according to embodiments of the present disclosure.

Referring to FIG. 3, the display panel (DISP) can include an active area (AA) in which an image is displayed and a non-active area (NA) that is an outer area of an outer boundary line (BL) of the active area (AA).

In the active area (AA) of the display panel (DISP), a plurality of subpixels for displaying images is arranged, and various electrodes and signal lines for driving the display are arranged.

In addition, a plurality of touch electrodes for touch sensing and a plurality of touch routing lines electrically connected to the touch electrodes can be arranged in the active area (AA) of the display panel (DISP). Accordingly, the active area (AA) can be referred to as a "touch sensing area" in which a touch is able to be sensed.

In the non-active area (NA) of the display panel (DISP), link lines, which are extensions of various signal lines arranged in the active area (AA), or link lines electrically connected to various signal lines arranged in the active area (AA) and pads electrically connected to the link lines can be arranged. The pads arranged in the non-active area (NA) can be bonded or electrically connected to the display driving circuits (DDC, GDC, or the like).

In addition, in the non-active area (NA) of the display panel (DISP), link lines, which are extensions of a plurality of touch routing lines arranged in the active area (AA), or link lines electrically connected to the plurality of touch routing lines arranged in the active area (AA) and pads electrically connected to the link lines can be arranged. The pads arranged in the non-active area (NA) can be bonded or electrically connected to the touch driving circuit (TDC).

An extended portion of a part of the outermost touch electrode, among the plurality of touch electrodes arranged in the active area (AA), can be in the non-active area (NA), and one or more electrodes (touch electrodes) of the same material as the plurality of touch electrodes arranged in the active area (AA) can be further arranged in the non-active area (NA).

That is, all of the plurality of touch electrodes arranged in the display panel (DISP) can be provided in the active area (AA); some (e.g., the outermost touch electrode) of the plurality of touch electrodes arranged in the display panel (DISP) can be provided in the non-active area (NA); or some (e.g., the outermost touch electrode) of the plurality of touch electrodes arranged in the display panel (DISP) can be provided over the active area (AA) and the non-active area (NA).

Referring to FIG. 3, the display panel (DISP) of a touch display device according to embodiments of the present disclosure can include a dam area (DA) where dams for preventing the collapse of a specific layer (e.g., an encapsulation portion in an organic light-emitting display panel) in the active area (AA) are arranged.

The dam area (DA) can be positioned at the boundary between the active area (AA) and the non-active area (NA) or at any place in the non-active area (NA) outside the active area (AA).

The dam can be arranged in the dam area (DA) so as to surround the active area (AA) in all directions, or can be arranged only in the outside of one or more portions (e.g., a portion having a vulnerable layer) of the active area (AA).

The dam arranged in the dam area (DA) can have a single pattern that is continuous as a whole, or can have two or more discontinuous patterns. Further, only a primary dam can be arranged in the dam area (DA), or two dams (a primary dam and a secondary dam) or three or more dams can be arranged in the dam area (DA).

Only a primary dam can be arranged in one direction, and both a primary dam and a secondary dam can be arranged in another direction, in the dam area (DA).

Figure 4:
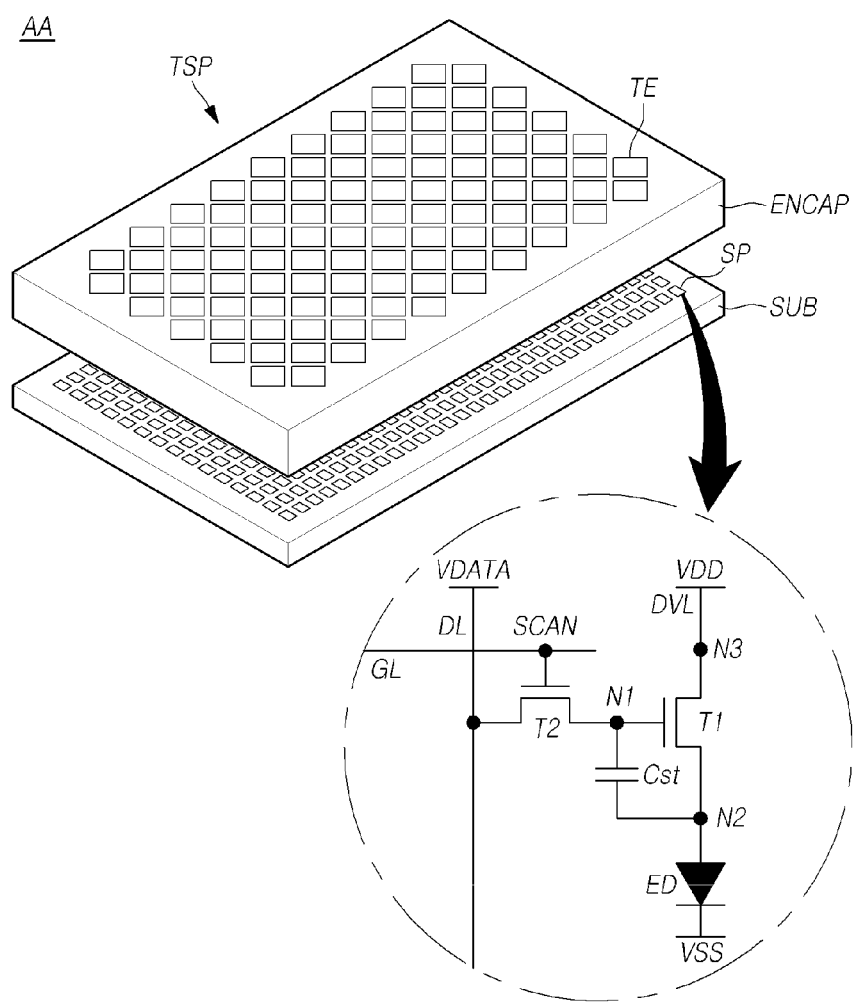
FIG. 4 is a view illustrating an example of a structure in which a touch panel is embedded in a display panel according to embodiments of the present disclosure.

FIG. 4 is a view illustrating an example of a structure in which a touch panel (TSP) is embedded in a display panel (DISP) according to embodiments of the present disclosure.

Referring to FIG. 4, a plurality of subpixels (SP) is arranged on a substrate (SUB) in the active area (AA) of the display panel (DISP).

Each subpixel (SP) can include a light-emitting device (ED), a first transistor (T1) for driving the light-emitting device (ED), a second transistor (T2) for transmitting a data voltage (VDATA) to a first node (N1) of the first transistor (T1), and a storage capacitor (Cst) for maintaining a constant voltage for one frame.

The first transistor (T1) can include a first node (N1) to which a data voltage can be applied, a second node (N2) electrically connected to the light-emitting device (ED), and a third node (N3) to which a driving voltage (VDD) is applied from a driving voltage line (DVL). The first node (N1) can be a gate node; the second node (N2) can be a source node or a drain node; and the third node (N3) can be a drain node or a source node. The first transistor (T1) is also referred to as a "driving transistor" for driving the light-emitting device (ED).

The light-emitting device (ED) can include a first electrode (e.g., an anode electrode), a light-emitting layer, and a second electrode (e.g., a cathode electrode). The first electrode can be electrically connected to the second node (N2) of the first transistor (T1), and the second electrode can have a base voltage (VSS) applied thereto.

The light-emitting layer of the light-emitting device (ED) can be an organic light-emitting layer containing an organic material. In this case, the light-emitting device (ED) can be an organic light-emitting diode (OLED).

The second transistor (T2) can be controlled to be turned on and off by a scan signal (SCAN) applied through a gate line (GL), and can be electrically connected between the first node (N1) of the first transistor (T1) and the data line (DL). The second transistor (T2) is also referred to as a "switching transistor".

If the second transistor (T2) is turned on by the scan signal (SCAN), the second transistor (T2) transfers a data voltage (VDATA) supplied from the data line (DL) to the first node (N1) of the first transistor (T1).

The storage capacitor (Cst) can be electrically connected between the first node (N1) and the second node (N2) of the first transistor (T1).

Each subpixel (SP), as shown in FIG. 4, can have a 2T1C structure including two transistors (T1 and T2) and one capacitor (Cst), and can further include one or more transistors, or can further include one or more capacitors in some cases.

The storage capacitor (Cst) can be an external capacitor that is intentionally designed so as to be provided outside the first transistor (T1), instead of a parasitic capacitor (e.g., Cgs or Cgd), which is an internal capacitor to be provided between the first node (N1) and the second node (N2) of the first transistor (T1).

Each of the first transistor (T1) and the second transistor (T2) can be an n-type transistor or a p-type transistor.

As described above, circuit devices, such as a light-emitting device (ED), two or more transistors (T1 and T2), and one or more capacitors (Cst), are arranged in the display panel (DISP). Since the circuit devices (in particular, the light-emitting device ED) are vulnerable to external moisture or oxygen, an encapsulation portion (ENCAP) for preventing external moisture or oxygen from penetrating into the circuit devices (in particular, the light-emitting device ED) can be provided in the display panel (DISP).

The encapsulation portion (ENCAP) can be formed as a single layer or multiple layers.

The touch panel (TSP) can be formed on the encapsulation portion (ENCAP) in the touch display device 100 according to embodiments of the present disclosure.

That is, a touch sensor structure, such as a plurality of touch electrodes (TE) constituting the touch panel (TSP), can be arranged on the encapsulation portion (ENCAP) in the touch display device 100.

When sensing a touch, a touch-driving signal or a touch-sensing signal can be applied to the touch electrodes (TE). Therefore, when sensing a touch, a potential difference can be produced between the touch electrode (TE) and the cathode electrode arranged with the encapsulation portion (ENCAP) interposed therebetween, thereby incurring unnecessary parasitic capacitance. In order to reduce the parasitic capacitance, which can degrade touch sensitivity, the distance between the touch electrode (TE) and the cathode electrode can be designed to be equal to or greater than a predetermined value (e.g., 1 µm) in consideration of the panel thickness, panel-manufacturing processes, display performance, and the like. To this end, the thickness of the encapsulation portion (ENCAP), for example, can be designed to be at least 1 µm or more.

Figure 5:
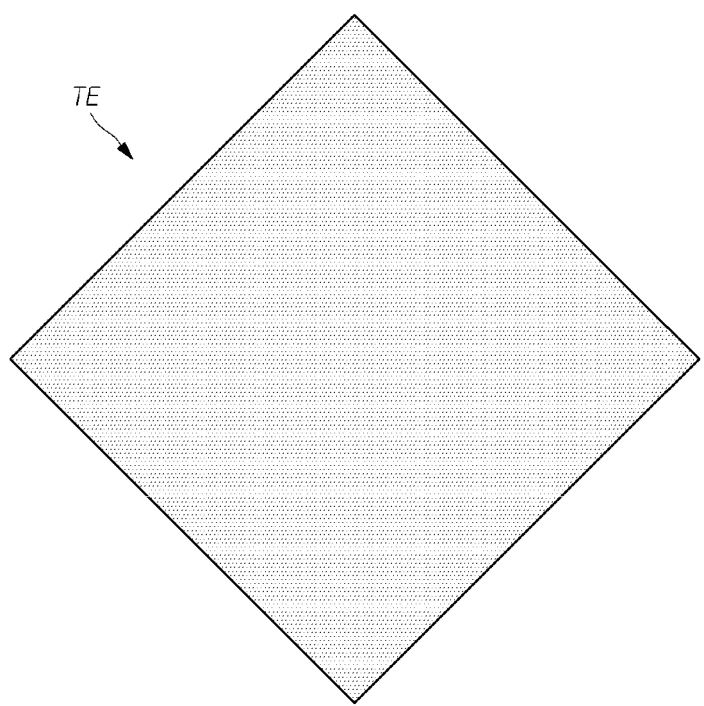
FIGS. 5 and 6 are views illustrating examples of the types of touch electrodes arranged in a display panel according to embodiments of the present disclosure.
Figure 6:
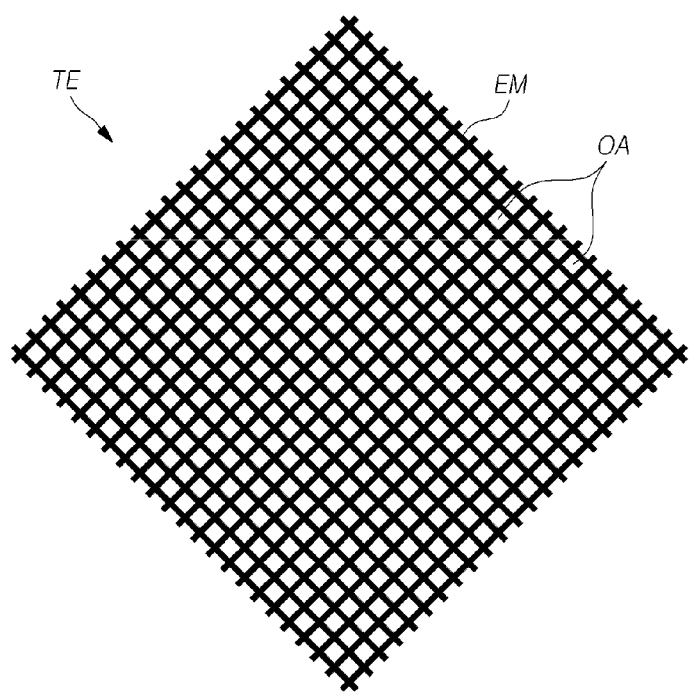

FIGS. 5 and 6 are views illustrating examples of the types of touch electrodes (TE) arranged in a display panel (DISP) according to embodiments of the present disclosure.

As shown in FIG. 5, each touch electrode (TE) arranged in the display panel (DISP) can be a plate-type electrode metal having no openings. In this case, each touch electrode (TE) can be a transparent electrode. That is, each touch electrode (TE) can be made of a transparent electrode material so that light emitted from a plurality of subpixels (SP) arranged thereunder can pass upwards through the touch electrode (TE).

Alternatively, as shown in FIG. 6, each touch electrode (TE) arranged in the display panel (DISP) can be an electrode metal (EM) patterned in the form of a mesh so as to have two or more openings (OA).

The electrode metal (EM) corresponds to a substantial touch electrode (TE) where a touch-driving signal is applied or a touch-sensing signal is detected.

As shown in FIG. 6, in the case where each touch electrode (TE) is an electrode metal (EM) patterned in the form of a mesh, two or more openings (OA) can be provided in the area of the touch electrode (TE).

Each of the two or more openings (OA) provided in each touch electrode (TE) can correspond to the light-emitting area of one or more subpixels (SP). That is, a plurality of openings (OA) provides paths through which light emitted from a plurality of subpixels (SP) arranged thereunder passes. Hereinafter, a description will be made of an example in which each touch electrode (TE) is a mesh-type electrode metal (EM) for the convenience of explanation.

The electrode metal (EM) corresponding to each touch electrode (TE) can be positioned on a bank that is arranged in the area other than the light-emitting area of two or more subpixels (SP). Additionally, each touch electrodes (TE) can be a mesh type including an open area (or openings (OA)), and the open area positionally corresponds to a light emitting region of the plurality of subpixels (SP).

As a method of forming a plurality of touch electrodes (TE), the electrode metal (EM) can be formed to be wide in the form of a mesh, and then the electrode metal (EM) can be cut into a predetermined pattern to electrically isolate the electrode metal (EM), thereby providing a plurality of touch electrodes (TE).

The outline of the touch electrode (TE) can have a square shape, such as a diamond shape or a rhombus, as shown in FIGS. 5 and 6, or can have various shapes such as a triangle, a pentagon, or a hexagon.

Figure 7:
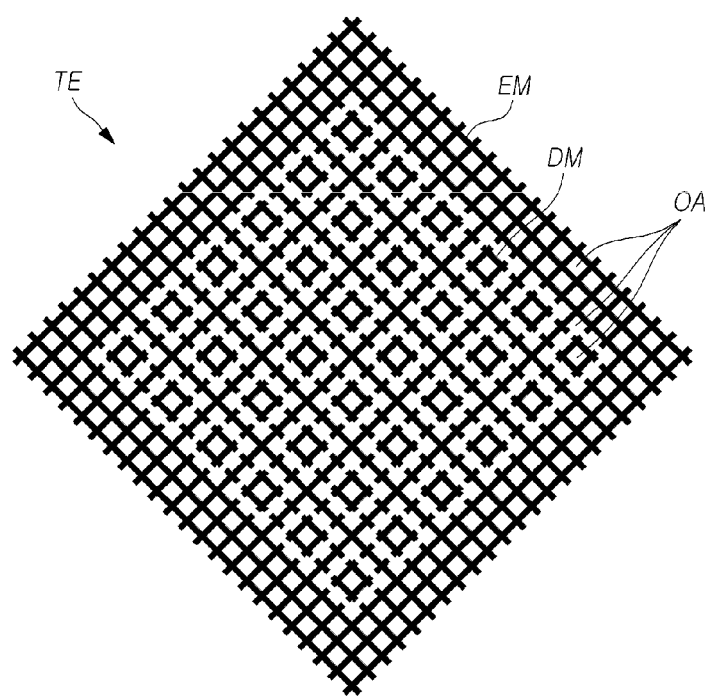
FIG. 7 is a view illustrating an example of the mesh-type touch electrode shown in FIG. 6.

FIG. 7 is a view illustrating an example of the mesh-type touch electrode (TE) shown in FIG. 6.

Referring to FIG. 7, the area of each touch electrode (TE) can be provided with one or more dummy metals (DM) that are separate from the mesh-type electrode metal (EM).

The electrode metal (EM) corresponds to a substantial touch electrode (TE) where a touch-driving signal is applied or a touch-sensing signal is detected. However, although the dummy metal (DM) is provided in the area of the touch electrode (TE), a touch-driving signal is not applied thereto and a touch-sensing signal is not detected therefrom. That is, the dummy metal (DM) can be an electrically floating metal.

Therefore, the electrode metal (EM) can be electrically connected to the touch driving circuit (TDC), whereas the dummy metal (DM) need not be electrically connected to the touch driving circuit (TDC).

One or more dummy metals (DM) can be provided in the areas of the respective touch electrodes (TE) while being disconnected from the electrode metal (EM).

Alternatively, one or more dummy metals (DM) can be provided in the areas of some of the touch electrodes (TE) while being disconnected from the electrode metal (EM). That is, the dummy metal (DM) need not be provided in the areas of some touch electrodes (TE).

With regard to the role of the dummy metal (DM), in the case where no dummy metal (DM) is provided and only the mesh-type electrode metal (EM) is provided in the area of the touch electrode (TE) as shown in FIG. 6, there can be a visible defect in which the outline of the electrode metal (EM) can be viewed on the screen.

On the other hand, in the case where one or more dummy metals (DM) are provided in the area of the touch electrode (TE) as shown in FIG. 7, it is possible to remove the visible defect in which the outline of the electrode metal (EM) can be viewed on the screen.

In addition, the magnitude of the capacitance for each touch electrode (TE) can be adjusted by providing or not providing the dummy metals (DM) or by adjusting the number of dummy metals (DM) (the ratio of dummy metals) for each touch electrode (TE), thereby enhancing the touch sensitivity.

Some points of the electrode metal (EM) formed in the area of one touch electrode (TE) can be cut away so that the cut electrode metal (EM) becomes the dummy metal (DM). That is, the electrode metal (EM) and the dummy metal (DM) can be formed of the same material in the same layer.

The touch display device 100 according to embodiments of the present disclosure can sense a touch on the basis of the capacitance produced in the touch electrode (TE).

The touch display device 100 according to embodiments of the present disclosure is able to sense a touch by a capacitance-based touch sensing method such as a mutual-capacitance-based touch sensing method or a self-capacitance-based touch sensing method.

In the case of the mutual-capacitance-based touch sensing method, a plurality of touch electrodes (TE) can be divided into driving touch electrodes (transmitting touch electrodes or TX touch electrodes) to which a touch-driving signal is applied and sensing touch electrodes (receiving touch electrodes or RX touch electrodes), in which a touch-sensing signal is detected, forming capacitance with the driving touch electrodes.

In the case of the mutual-capacitance-based touch sensing method, a touch sensing circuit (TSC) senses whether or not a touch is performed and/or touch coordinates on the basis of a change in the capacitance (mutual-capacitance) between the driving touch electrode and the sensing touch electrode depending on whether or not there is a pointer such as a finger or a pen.

In the case of the self-capacitance-based touch sensing method, each touch electrode (TE) serves as both the driving touch electrode and the sensing touch electrode. That is, the touch sensing circuit (TSC) applies a touch-driving signal to one or more touch electrodes (TE), detects a touch-sensing signal through the touch electrodes (TE) to which the touch-driving signal is applied, and recognizes a change in the capacitance between a pointer, such as a finger or a pen, and the touch electrode (TE) on the basis of the detected touch-sensing signal, thereby sensing whether or not a touch is performed and/or touch coordinates. The self-capacitance-based touch sensing method does not distinguish between the driving touch electrode and the sensing touch electrode.

As described above, the touch display device 100 according to embodiments of the present disclosure can sense a touch by a mutual-capacitance-based touch sensing method or by a self-capacitance-based touch sensing method. Hereinafter, for the convenience of explanation, a description will be made of an example in which the touch display device 100 performs mutual-capacitance-based touch sensing and has a touch sensor structure for the same.

Figure 8:
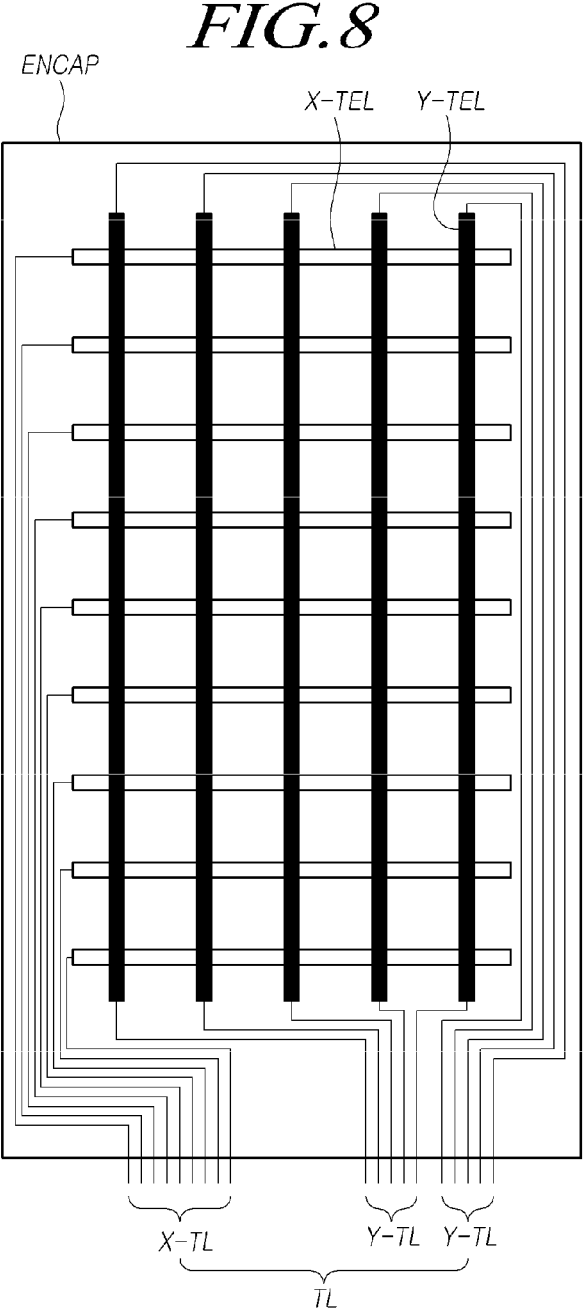
FIG. 8 is a view schematically illustrating a touch sensor structure in a display panel according to embodiments of the present disclosure.
Figure 9:
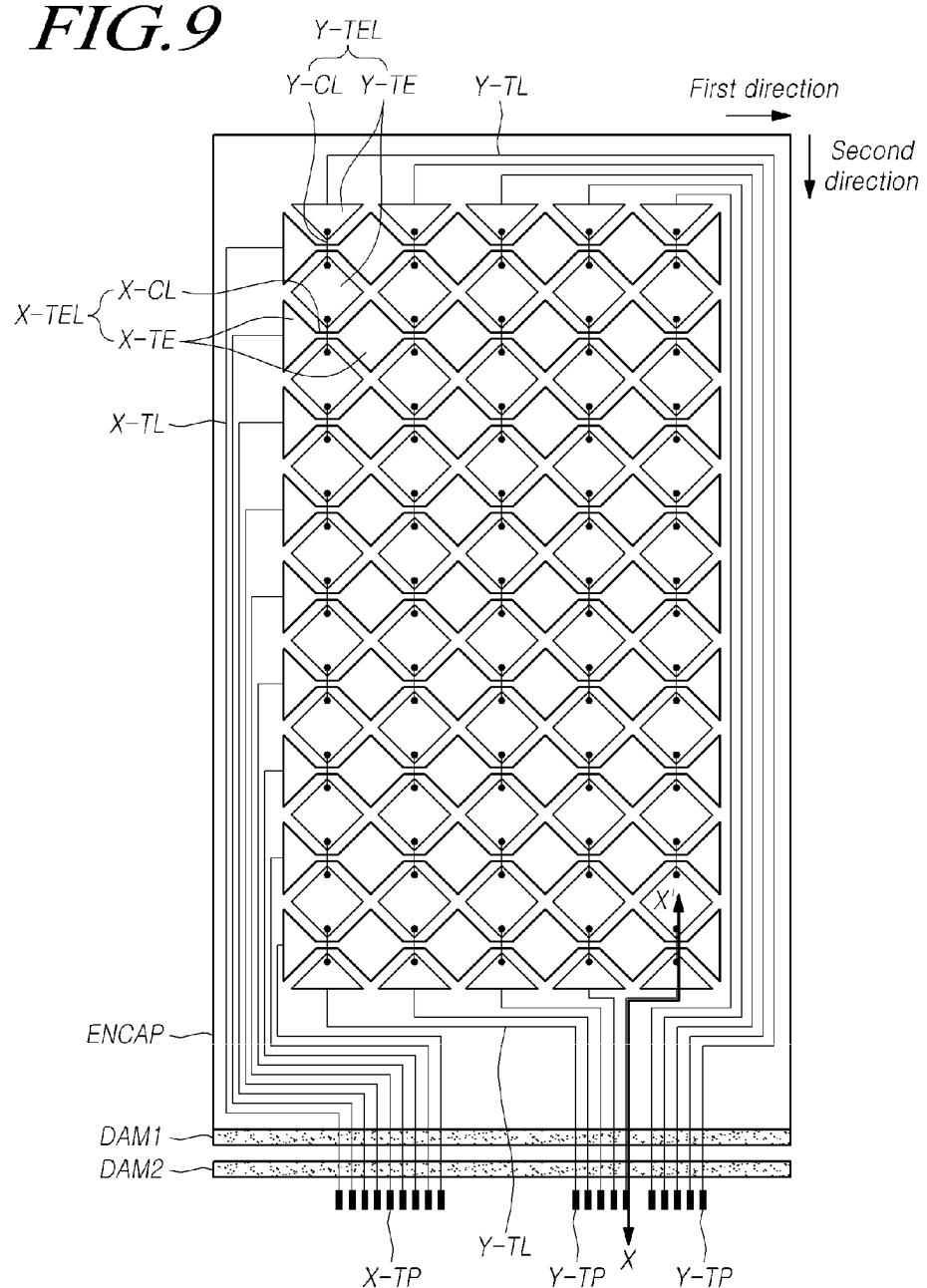
FIG. 9 is a view illustrating an example of implementing the touch sensor structure shown in FIG. 8.

FIG. 8 is a view schematically illustrating a touch sensor structure in a display panel (DISP) according to embodiments of the present disclosure, and FIG. 9 is a view illustrating an example of implementing the touch sensor structure in FIG. 8.

Referring to FIG. 8, a touch sensor structure for mutual-capacitance-based touch sensing can include a plurality of X-touch electrode lines (X-TEL) and a plurality of Y-touch electrode lines (Y-TEL). The plurality of X-touch electrode lines (X-TEL) and the plurality of Y-touch electrode lines (Y-TEL) are positioned on the encapsulation portion (ENCAP).

The respective X-touch electrode lines (X-TEL) are arranged in a first direction, and the respective Y-touch electrode lines (Y-TEL) are arranged in a second direction different from the first direction.

In the present specification, the first direction and the second direction can be different from each other, and for example, the first direction can be the x-axis direction and the second direction can be the y-axis direction. On the other hand, the first direction can be the y-axis direction and the second direction can be the x-axis direction. In addition, the first direction and the second direction can or need not be orthogonal to each other. In the present specification, rows and columns are relative, and can be interchanged with each other depending on the point of view.

Each of the plurality of X-touch electrode lines (X-TEL) can include a plurality of X-touch electrodes (X-TE) electrically connected to each other. Each of the plurality of Y-touch electrode lines (Y-TEL) can include a plurality of Y-touch electrodes (Y-TE) electrically connected to each other.

The plurality of X-touch electrodes (X-TE) and the plurality of Y-touch electrodes (Y-TE) belong to a plurality of touch electrodes (TE), and have different roles (functions) from each other.

For example, a plurality of X-touch electrodes (X-TE) constituting each of the plurality of X-touch electrode lines (X-TEL) can be driving touch electrodes, and a plurality of Y-touch electrodes (Y-TE) constituting each of the plurality of Y-touch electrode lines (Y-TEL) can be sensing touch electrodes. In this case, the respective X-touch electrode lines (X-TEL) correspond to driving touch electrode lines, and the respective Y-touch electrode lines (Y-TEL) correspond to sensing touch electrode lines.

On the other hand, a plurality of X-touch electrodes (X-TE) constituting each of the plurality of X-touch electrode lines (X-TEL) can be sensing touch electrodes, and a plurality of Y-touch electrodes (Y-TE) constituting each of the plurality of Y-touch electrode lines (Y-TEL) can be driving touch electrodes. In this case, the respective X-touch electrode lines (X-TEL) correspond to sensing touch electrode lines, and the respective Y-touch electrode lines (Y-TEL) correspond to driving touch electrode lines.

The touch sensor metal for touch sensing can include a plurality of touch routing lines (TL), as well as the plurality of X-touch electrode lines (X-TEL) and the plurality of Y-touch electrode lines (Y-TEL).

The plurality of touch routing lines (TL) can include one or more X-touch routing lines (X-TL) connected to the respective X-touch electrode lines (X-TEL) and one or more Y-touch routing lines (Y-TL) connected to the respective Y-touch electrode lines (Y-TEL).

Referring to FIG. 9, each of the plurality of X-touch electrode lines (X-TEL) can include a plurality of X-touch electrodes (X-TE) arranged in the same row (or column) and one or more X-touch electrode connecting lines (X-CL) for electrically connecting the same to each other. The X-touch electrode connecting line (X-CL) for connecting two adjacent X-touch electrodes (X-TE) can be a metal that is integral with two adjacent X-touch electrodes (X-TE) (see FIG. 9), or can be a metal connected with two adjacent X-touch electrodes (X-TE) through contact holes.

Each of the plurality of Y-touch electrode lines (Y-TEL) can include a plurality of Y-touch electrodes (Y-TE) arranged in the same column (or row) and one or more Y-touch electrode connecting lines (Y-CL) for electrically connecting the same to each other. The Y-touch electrode connecting line (Y-CL) for connecting two adjacent Y-touch electrodes (Y-TE) can be a metal that is integral with two adjacent Y-touch electrodes (Y-TE), or can be a metal connected to two adjacent Y-touch electrodes (Y-TE) through contact holes (see FIG. 9).

The X-touch electrode connecting line (X-CL) and the Y-touch electrode connecting line (Y-CL) can intersect each other in the area (a touch-electrode line intersection area) where the X-touch electrode line (X-TEL) and the Y-touch electrode line (Y-TEL) intersect each other.

In the case where the X-touch electrode connecting line (X-CL) and the Y-touch electrode connecting line (Y-CL) intersect in the touch-electrode line intersection area as described above, the X-touch electrode connecting line (X-CL) and the Y-touch electrode connecting line (Y-CL) must be positioned in different layers from each other.

Accordingly, in order to achieve an arrangement such that the plurality of X-touch electrode lines (X-TEL) and the plurality of Y-touch electrode lines (Y-TEL) intersect each other, the plurality of X-touch electrodes (X-TE), the plurality of X-touch electrode connecting lines (X-CL), the plurality of Y-touch electrodes (Y-TE), the plurality of Y-touch electrode lines (Y-TEL), and the plurality of Y-touch electrode connecting lines (Y-CL) can be provided in two or more layers.

Referring to FIG. 9, the respective X-touch electrode lines (X-TEL) are electrically connected to corresponding X-touch pads (X-TP) via one or more X-touch routing lines (X-TL). That is, the outermost X-touch electrode (X-TE), among the plurality of X-touch electrodes (X-TE) included in one X-touch electrode line (X-TEL), is electrically connected to the corresponding X-touch pad (X-TP) via the X-touch routing line (X-TL).

The respective Y-touch electrode lines (Y-TEL) are electrically connected to corresponding Y-touch pads (Y-TP) via one or more Y-touch routing lines (Y-TL). That is, the outermost Y-touch electrode (Y-TE), among the plurality of Y-touch electrodes (Y-TE) included in one Y-touch electrode line (Y-TEL), is electrically connected to the corresponding Y-touch pad (Y-TP) via the Y-touch routing line (Y-TL).

As shown in FIG. 9, the plurality of X-touch electrode lines (X-TEL) and the plurality of Y-touch electrode lines (Y-TEL) can be arranged on the encapsulation portion (ENCAP). That is, the plurality of X-touch electrodes (X-TE) and the plurality of X-touch electrode connecting lines (X-CL) constituting the plurality of X-touch electrode lines (X-TEL) can be arranged on the encapsulation portion (ENCAP). The plurality of Y-touch electrodes (Y-TE) and the plurality of Y-touch electrode connecting lines (Y-CL) constituting the plurality of Y-touch electrode lines (Y-TEL) can be arranged on the encapsulation portion (ENCAP).

As shown in FIG. 9, the respective X-touch routing lines (X-TL) electrically connected to the plurality of X-touch electrode lines (X-TEL) can be arranged on the encapsulation portion (ENCAP) so as to extend to the area where the encapsulation portion (ENCAP) is not provided, and can be electrically connected to a plurality of X-touch pads (X-TP). The respective Y-touch routing lines (Y-TL) electrically connected to the plurality of Y-touch electrode lines (Y-TEL) can be arranged on the encapsulation portion (ENCAP) so as to extend to the area where the encapsulation portion (EN-CAP) is not provided, and can be electrically connected to a plurality of Y-touch pads (Y-TP). The encapsulation portion (ENCAP) can be provided in the active area (AA), and in some cases can extend to the non-active area (NA).

As described above, a dam area (DA) can be provided in the boundary area between the active area (AA) and the non-active area (NA) or in the non-active area (NA) outside the active area (AA) in order to prevent any layer (e.g., an encapsulation portion in the organic light-emitting display panel) in the active area (AA) from collapsing.

As shown in FIG. 9, for example, a primary dam (DAM1) and a secondary dam (DAM2) can be arranged in the dam area (DA). The secondary dam (DAM2) can be positioned outside the primary dam (DAM1).

As alternatives to the example in FIG. 9, only the primary dam (DAM1) can be provided in the dam area (DA), and in some cases, one or more additional dams can be further arranged in the dam area (DA), as well as the primary dam (DAM1) and the secondary dam (DAM2).

Referring to FIG. 9, the encapsulation portion (ENCAP) can be positioned on the side of the primary dam (DAM1), or the encapsulation portion (ENCAP) can be positioned on the top of the primary dam (DAM1), as well as on the side thereof.

Figure 10:
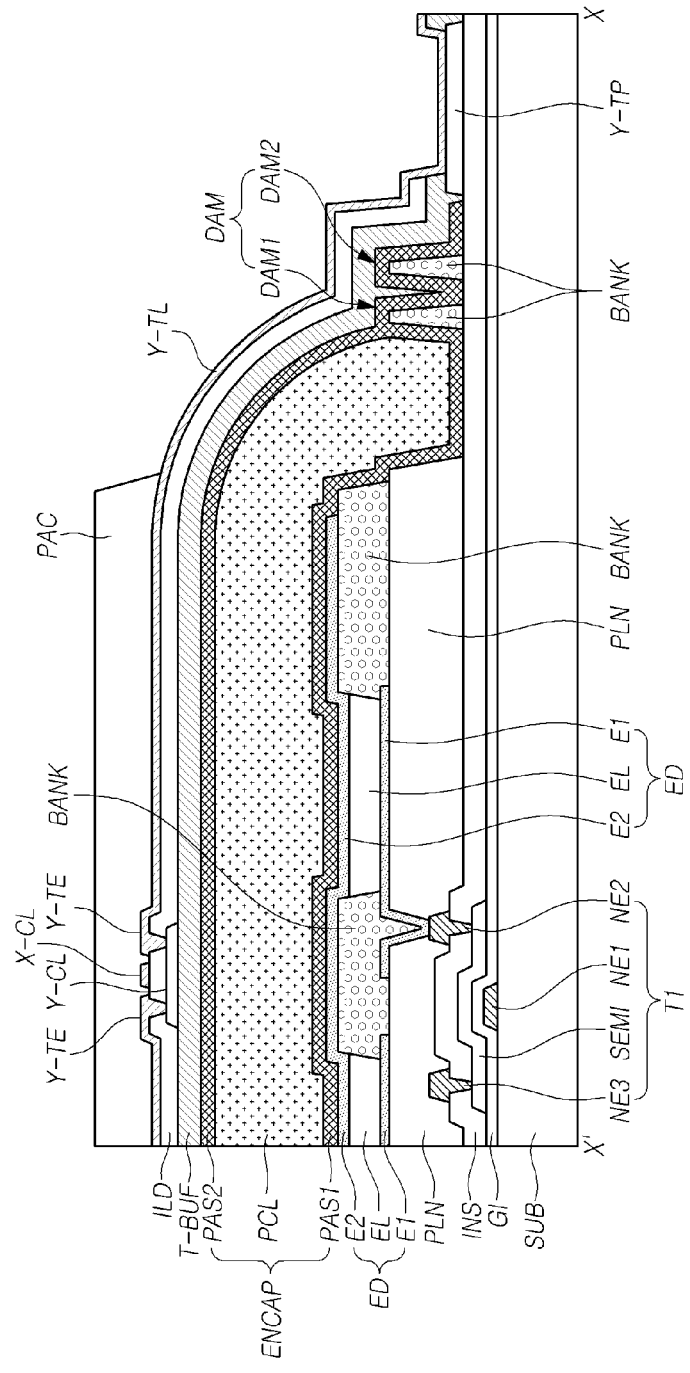
FIG. 10 is a cross-sectional view of a part of a display panel taken along the line X-X' in FIG. 9 according to embodiments of the present disclosure.

FIG. 10 is a cross-sectional view of a part of a display panel (DISP) taken along the line X-X' in FIG. 9 according to embodiments of the present disclosure. Although a plate-type touch electrode (TE) is illustrated in FIG. 10, this is merely an example, and a mesh-type touch electrode can be provided.

A first transistor (T1), which is a driving transistor in each subpixel (SP) in the active area (AA), is arranged on a substrate (SUB).

The first transistor (T1) includes a first node electrode (NE1) corresponding to a gate electrode, a second node electrode (NE2) corresponding to a source electrode or a drain electrode, a third node electrode (NE3) corresponding to a drain electrode or a source electrode, a semiconductor layer (SEMI), and the like.

The first node electrode (NE1) and the semiconductor layer (SEMI) can overlap each other with a gate insulating film (GI) interposed therebetween. The second node electrode (NE2) can be folioed on an insulating layer (INS) so as to come into contact with one end of the semiconductor layer (SEMI), and the third node electrode (NE3) can be formed on the insulating layer (INS) so as to come into contact with the opposite end of the semiconductor layer (SEMI).

A light-emitting device (ED) can include a first electrode (E1) corresponding to an anode electrode (or a cathode electrode), a light-emitting layer (EL) folioed on the first electrode (E1), and a second electrode (E2), which corresponds to a cathode electrode (or an anode electrode), folioed on the light-emitting layer (EL).

The first electrode (E1) is electrically connected to the second node electrode (NE2) of the first transistor (T1), which is exposed through a pixel contact hole passing through a planarization layer (PLN).

The light-emitting layer (EL) is formed on the first electrode (E1) in the light-emitting area provided by a bank (BANK). The light-emitting layer (EL) is formed by stacking layers in the order of a hole-related layer, a light-emitting layer, and an electron-related layer, or in the reverse order thereof, on the first electrode (E1). The second electrode (E2) is formed to face the first electrode (E1) with the light-emitting layer (EL) interposed therebetween.

The encapsulation portion (ENCAP) prevents external moisture or oxygen from penetrating into the light-emitting device (ED), which is vulnerable to external moisture or oxygen.

The encapsulation portion (ENCAP) can be configured as a single layer, or can be configured as multiple layers (PAS1, PCL, and PAS2) as shown in FIG. 10.

For example, in the case where the encapsulation portion (ENCAP) is configured as multiple layers (PAS1, PCL, and PAS2), the encapsulation portion (ENCAP) can include one or more inorganic encapsulation layers (PAS1 and PAS2) and one or more organic encapsulation layers (PCL). More specifically, the encapsulation portion (ENCAP) can have a structure in which a first inorganic encapsulation layer (PAS1), an organic encapsulation layer (PCL), and a second inorganic encapsulation layer (PAS2) are sequentially stacked.

The organic encapsulation layer (PCL) can further include at least one organic encapsulation layer or at least one inorganic encapsulation layer.

The first inorganic encapsulation layer (PAS1) is formed on the substrate (SUB), on which the second electrode (E2) corresponding to a cathode electrode is formed, so as to be closest to the light-emitting device (ED). The first inorganic encapsulation layer (PAS1) is formed of an inorganic insulating material that enables low-temperature deposition, such as silicon nitride ($SiN_x$), silicon oxide ($SiO_x$), silicon oxynitride (SiON), aluminum oxide ($Al_2O_3$), or the like. Since the first inorganic encapsulation layer (PAS1) is deposited in a low-temperature atmosphere, the first inorganic encapsulation layer (PAS1) is able to prevent the light-emitting layer (EL), which is vulnerable to a high-temperature atmosphere, from being damaged during the deposition process.

The organic encapsulation layer (PCL) can be formed to have an area smaller than that of the first inorganic encapsulation layer (PAS1). In this case, the organic encapsulation layer (PCL) can be folioed to expose both ends of the first inorganic encapsulation layer (PAS1). The organic encapsulation layer (PCL) can serve as a buffer for relieving the stress between the respective layers due to warping of the touch display device, which is an organic light-emitting display device, and can strengthen planarization performance. The organic encapsulation layer (PCL) can be folioed of an organic insulating material such as an acrylic resin, an epoxy resin, polyimide, polyethylene, silicon oxycarbide (SiOC), or the like.

In the case where the organic encapsulation layer (PCL) is formed by an inkjet method, one or more dams (DAM) can be formed in the dam area (DA) corresponding to the boundary area between the non-active area (NA) and the active area (AA) or corresponding to some areas of the non-active area (NA).

For example, as shown in FIG. 10, the dam area (DA) is located between a pad area where a plurality of X-touch pads (X-TP) and a plurality of Y-touch pads (Y-TP) are famed in the non-active area (NA) and the active area (AA), and the dam area (DA) can be provided with a primary dam (DAM1) adjacent to the active area (AA) and a secondary dam (DAM2) adjacent to the pad area.

One or more dams (DAM) arranged in the dam area (DA) can prevent a liquid organic encapsulation layer (PCL) from collapsing toward the non-active area (NA) and infiltrating into the pad area when the liquid organic encapsulation layer (PCL) is dropped into the active area (AA).

This effect can be further increased in the case where the primary dam (DAM1) and the secondary dam (DAM2) are provided as shown in FIG. 10.

The primary dam (DAM1) and/or the secondary dam (DAM2) can be formed as a single-layered or a multi-layered structure. For example, the primary dam (DAM1) and/or the secondary dam (DAM2) can be foiled of the same material as at least one of the banks (BANK) and spacers (not shown) at the same time. In this case, the dam structure can be folioed without requiring an additional mask process and increasing costs.

In addition, the primary dam (DAM1) and the secondary dam (DAM2) can have a structure in which the first inorganic encapsulation layer (PAS1) and/or the second inorganic encapsulation layer (PAS2) are stacked on the banks (BANK) as shown in FIG. 10.

In addition, the organic encapsulation layer (PCL) containing the organic material can be positioned only inside the primary dam (DAM1) as shown in FIG. 10.

Alternatively, the organic encapsulation layer (PCL) containing the organic material can also be positioned on the top of at least a part of the primary dam (DAM1) and the secondary dam (DAM2). For example, the organic encapsulation layer (PCL) can also be positioned on the top of the primary dam (DAM1).

The second inorganic encapsulation layer (PAS2) can be folioed so as to cover the top surface and the side surface of each of the organic encapsulation layer (PCL) and the first inorganic encapsulation layer (PAS1) on the substrate (SUB) on which the organic encapsulation layer (PCL) is formed. The second inorganic encapsulation layer (PAS2) minimizes or prevents external moisture or oxygen from penetrating into the first inorganic encapsulation layer (PAS1) and the organic encapsulation layer (PCL). The second inorganic encapsulation layer (PAS2) is folioed of an inorganic insulating material such as silicon nitride ($SiN_x$), silicon oxide ($SiO_x$), silicon oxynitride (SiON), aluminum oxide ($Al_2O_3$), or the like.

A touch buffer film (T-BUF) can be arranged on the encapsulation portion (ENCAP). The touch buffer film (T-BUF) can be provided between the touch sensor metal including X- and Y-touch electrodes (X-TE and Y-TE) and X- and Y-touch electrode connecting lines (X-CL and Y-CL) and the second electrode (E2) of the light-emitting device (ED).

The touch buffer film (T-BUF) can be designed to maintain the distance between the touch sensor metal and the second electrode (E2) of the light-emitting device (ED) at a predetermined minimum separation distance (e.g., 1 μm). Accordingly, it is possible to reduce or prevent the parasitic capacitance generated between the touch sensor metal and the second electrode (E2) of the light-emitting device (ED), thereby preventing deterioration of touch sensitivity due to the parasitic capacitance.

A touch sensor metal including the X- and Y-touch electrodes (X-TE and Y-TE) and the X- and Y-touch electrode connecting lines (X-CL and Y-CL) can be arranged on the encapsulation portion (ENCAP) without the touch buffer film (T-BUF).

In addition, the touch buffer film (T-BUF) can prevent chemical solutions (developer, etchant, or the like), used in the manufacturing process of the touch sensor metal arranged on the touch buffer film (T-BUF), or external moisture from penetrating into the light-emitting layer (EL) including organic materials. Accordingly, the touch buffer film (T-BUF) is able to prevent damage to the light-emitting layer (EL), which is vulnerable to chemical solutions or moisture.

The touch buffer film (T-BUF) is formed of an organic insulating material, which is able to be formed at a low temperature of less than a predetermined temperature (e.g., 100 degrees C.) and has a low permittivity of 1 to 3, in order to prevent damage to the light-emitting layer (EL) including an organic material that is vulnerable to high temperature. For example, the touch buffer film (T-BUF) can be formed of an acrylic-based, epoxy-based, or siloxane-based material. The touch buffer film (T-BUF), which is made of an organic insulating material so as to have a planarization property, can prevent damage to the respective encapsulation layers (PAS1, PCL, and PAS2) constituting the encapsulation portion (ENCAP) and the breakage of the touch sensor metal formed on the touch buffer film (T-BUF) due to warping of the organic light-emitting display device.

According to a mutual-capacitance-based touch sensor structure, X-touch electrode lines (X-TEL) and Y-touch electrode lines (Y-TEL) can be arranged so as to intersect each other on the touch buffer film (T-BUF).

The Y-touch electrode line (Y-TEL) can include a plurality of Y-touch electrodes (Y-TE) and a plurality of Y-touch electrode connecting lines (Y-CL) for electrically connecting the plurality of Y-touch electrodes (Y-TE) to each other.

As shown in FIG. 10, the plurality of Y-touch electrodes (Y-TE) and the plurality of Y-touch electrode connecting lines (Y-CL) can be provided in different layers, with a touch insulating film (ILD) interposed therebetween.

The plurality of Y-touch electrodes (Y-TE) can be spaced a predetermined distance apart from each other in the y-axis direction. Each of the plurality of Y-touch electrodes (Y-TE) can be electrically connected to another Y-touch electrode (Y-TE) adjacent thereto in the y-axis direction by means of the Y-touch electrode connecting line (Y-CL).

The Y-touch electrode connecting line (Y-CL) can be formed on the touch buffer film (T-BUF) so as to be exposed through a touch contact hole passing through the touch insulating film (ILD), and can be electrically connected to two adjacent Y-touch electrodes (Y-TE) in the y-axis direction.

The Y-touch electrode connecting line (Y-CL) can be arranged so as to overlap the bank (BANK). Accordingly, it is possible to prevent the aperture ratio from being lowered due to the Y-touch electrode connecting line (Y-CL).

The X-touch electrode line (X-TEL) can include a plurality of X-touch electrodes (X-TE) and a plurality of X-touch electrode connecting lines (X-CL) for electrically connecting the plurality of X-touch electrodes (X-TE) to each other. The plurality of X-touch electrodes (X-TE) and the plurality of X-touch electrode connecting lines (X-CL) can be provided in different layers with the touch insulating film (ILD) interposed therebetween.

The plurality of X-touch electrodes (X-TE) can be spaced a predetermined distance apart from each other in the x-axis direction on the touch insulating film (ILD). Each of the plurality of X-touch electrodes (X-TE) can be electrically connected to another X-touch electrode (X-TE) adjacent thereto in the x-axis direction through the X-touch electrode connecting line (X-CL).

The X-touch electrode connecting line (X-CL) can be arranged on the same plane as the X-touch electrodes (X-TE), and can be electrically connected to two X-touch electrodes (X-TE), which are adjacent to each other in the x-axis direction, without separate contact holes, or can be formed integrally with two X-touch electrodes (X-TE), which are adjacent to each other in the x-axis direction.

The X-touch electrode connecting line (X-CL) can be arranged to overlap the bank (BANK). Accordingly, it is possible to prevent the aperture ratio from being lowered due to the X-touch electrode connecting line (Y-CL).

The Y-touch electrode line (Y-TEL) can be electrically connected to the touch driving circuit (TDC) via the Y-touch routing line (Y-TL) and the Y-touch pad (Y-TP). Similarly, the X-touch electrode line (X-TEL) can be electrically connected to the touch driving circuit (TDC) via the X-touch routing line (X-TL) and the X-touch pad (X-TP).

A pad cover electrode covering the X-touch pad (X-TP) and the Y-touch pad (Y-TP) can be further arranged.

The X-touch pad (X-TP) can be formed separately from the X-touch routing line (X-TL), or can be formed by extending the X-touch routing line (X-TL). The Y-touch pad (Y-TP) can be formed separately from the Y-touch routing line (Y-TL), or can be formed by extending the Y-touch routing line (Y-TL).

In the case where the X-touch pad (X-TP) is formed by extending the X-touch routing line (X-TL) and the Y-touch pad (Y-TP) is formed by extending the Y-touch routing line (Y-TL), the X-touch pad (X-TP), the X-touch routing line (X-TL), the Y-touch pad (Y-TP), and the Y-touch routing line (Y-TL) can be formed of the same first conductive material. The first conductive material can be formed in a single-layered or multi-layered structure using a metal, such as Al, Ti, Cu, or Mo, which exhibits high corrosion resistance, high acid resistance, and high conductivity.

For example, the X-touch pad (X-TP), the X-touch routing line (X-TL), the Y-touch pad (Y-TP), and the Y-touch routing line (Y-TL), made of the first conductive material, can be folioed in a three-layered structure such as Ti/Al/Ti or Mo/Al/Mo.

The pad cover electrode capable of covering the X-touch pad (X-TP) and the Y-touch pad (Y-TP) can be made of a second conductive material that is the same as the X- and Y-touch electrodes (X-TE and Y-TE). The second conductive material can be a transparent conductive material, such as ITO or IZO, which exhibits high corrosion resistance and high acid resistance. The pad cover electrode can be formed to be exposed by the touch buffer film (T-BUF), so that the pad cover electrode can be bonded to the touch driving circuit (TDC) or can be bonded to a circuit film on which the touch driving circuit (TDC) is mounted.

The touch buffer film (T-BUF) can be formed to cover the touch sensor metal, thereby preventing the touch sensor metal from being corroded by external moisture or the like. For example, the touch buffer film (T-BUF) can be formed of an organic insulating material, or can be formed in the form of a circular polarizer or a film of an epoxy or acrylic material. The touch buffer film (T-BUF) need not be provided on the encapsulation portion (ENCAP). That is, the touch buffer film (T-BUF) need not be an essential element.

The Y-touch routing line (Y-TL) can be electrically connected to the Y-touch electrodes (Y-TE) through touch routing line contact holes, or can be integral with the Y-touch electrode (Y-TE).

The Y-touch routing line (Y-TL) can be extended to the non-active area (NA), and can pass over the top and side of the encapsulation portion (ENCAP) and the top and side of the dam (DAM) so as to be electrically connected to the Y-touch pad (Y-TP). Accordingly, the Y-touch routing line (Y-TL) can be electrically connected to the touch driving circuit (TDC) via the Y-touch pad (Y-TP).

The Y-touch routing line (Y-TL) can transmit a touch-sensing signal from the Y-touch electrode (Y-TE) to the touch driving circuit (TDC), or can receive a touch-driving signal from the touch driving circuit (TDC) to thus transfer the same to the Y-touch electrode (Y-TE).

The X-touch routing line (X-TL) can be electrically connected to the X-touch electrodes (X-TE) through touch routing line contact holes, or can be integral with the X-touch electrode (X-TE).

The X-touch routing line (X-TL) can be extended to the non-active area (NA), and can pass over the top and side of the encapsulation portion (ENCAP) and the top and side of the dam (DAM) so as to be electrically connected to the X-touch pad (X-TP). Accordingly, the X-touch routing line (X-TL) can be electrically connected to the touch driving circuit (TDC) via the X-touch pad (X-TP).

The X-touch routing line (X-TL) can receive a touch-driving signal from the touch driving circuit (TDC) to thus transfer the same to the X-touch electrode (X-TE), or can transfer a touch-sensing signal from the X-touch electrode (X-TE) to the touch driving circuit (TDC).

The layout of the X-touch routing lines (X-TL) and the Y-touch routing lines (Y-TL) can be variously modified depending on the panel design.

A touch protection film (PAC) can be arranged on the X-touch electrode (X-TE) and the Y-touch electrode (Y-TE). The touch protection film (PAC) can be extended to the front or back of the dam (DAM) so as to be arranged on the X-touch routing line (X-TL) and the Y-touch routing line (Y-TL).

In embodiments, one or more (or at least two) touch electrodes of the plurality of touch electrodes (X-TE or Y-TE) can be connected by a connection line (X-CL or Y-CL) formed on a different level layer from the one or more touch electrodes. At least one routing line of the plurality of routing lines (X-TL or Y-TL) can include a single layer, or multiple layers including a first layer and a second layer. The first layer can be a same level layer with the connection line, and the second layer can be a same level layer with the plurality of touch electrodes.

The cross-sectional view of FIG. 10 shows a conceptual structure, and thus the positions, thicknesses, or widths of the respective patterns (respective layers or respective electrodes) can vary depending on the viewing directions or positions; connection structures of the respective patterns can vary; other layers can be further provided in addition to the illustrated layers; and some of the illustrated layers can be omitted or integrated. For example, the width of the bank (BANK) can be smaller than that illustrated in the drawing, and the height of the dam (DAM) can be less than or greater than that illustrated in the drawing.

Figure 11:
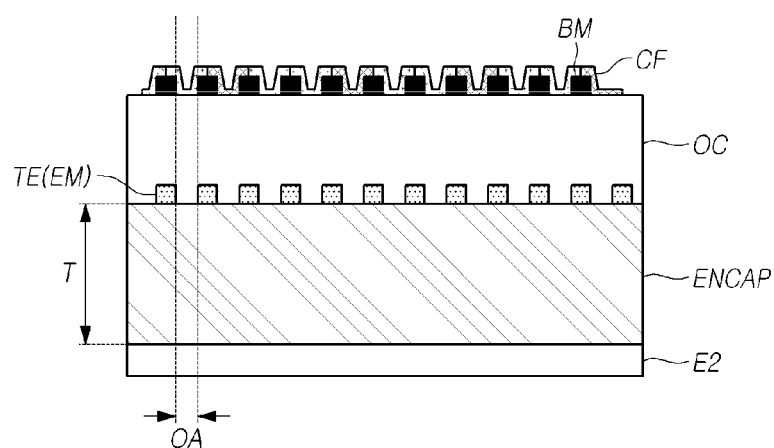
FIGS. 11 and 12 are views illustrating examples of a cross-sectional structure of a display panel including a color filter according to embodiments of the present disclosure.
Figure 12:
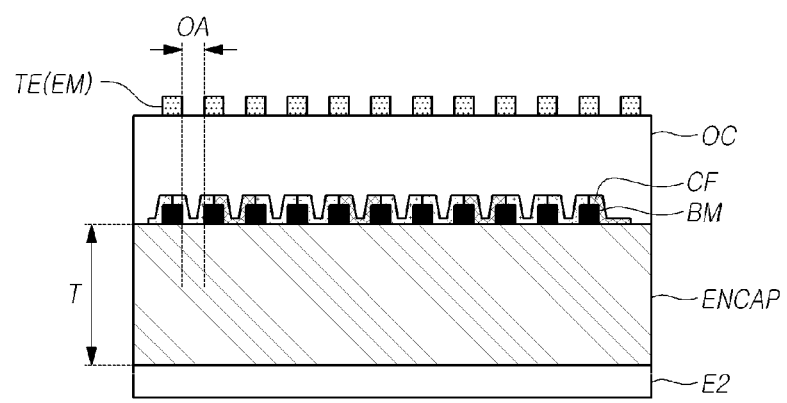

FIGS. 11 and 12 are views illustrating examples of a cross-sectional structure of a display panel (DISP) including a color filter (CF) according to embodiments of the present disclosure.

Referring to FIGS. 11 and 12, in the case where the touch panel (TSP) is embedded in the display panel (DISP) and the display panel (DISP) is implemented as an organic light-emitting display panel, the touch panel (TSP) can be positioned on the encapsulation portion (ENCAP) in the display panel (DISP). In other words, the touch sensor metal, such as a plurality of touch electrodes (TE), a plurality of touch routing lines (TL), and the like, can be positioned on the encapsulation portion (ENCAP) in the display panel (DISP).

As described above, since the touch electrodes (TE) are provided on the encapsulation portion (ENCAP), it is possible to form the touch electrodes (TE) without significantly affecting the display performance and display-related layer formation.

Referring to FIGS. 11 and 12, a second electrode (E2), which can be a cathode electrode of an organic light-emitting diode (OLED), can be provided below the encapsulation portion (ENCAP).

The thickness (T) of the encapsulation portion (ENCAP) can be, for example, 1 micrometer or more.

As described above, it is possible to reduce the parasitic capacitance generated between the second electrode (E2) and the touch electrode (TE) of the organic light-emitting diode (OLED) by designing the encapsulation portion (ENCAP) so as to have a thickness of 1 micrometer or more. Thus, it is possible to prevent deterioration in touch sensitivity due to the parasitic capacitance.

As described above, each of the plurality of touch electrodes (TE) can be patterned in the form of a mesh in which the electrode metal (EM) has two or more openings (OA), and each of the two or more openings (OA) can correspond to one or more subpixels or the light-emitting area thereof in the vertical direction.

As described above, the electrode metal (EM) of the touch electrode (TE) can be patterned such that the light-emitting area of one or more subpixels is located so as to correspond to the position of each of two or more openings (OA) provided in the area of the touch electrode (TE) in a plan view, thereby increasing the luminous efficiency of the display panel (DISP)

As shown in FIGS. 11 and 12, a black matrix (BM) can be arranged on the display panel (DISP), and a color filter (CF) can be further arranged thereon.

The position of the black matrix (BM) can correspond to the position of the electrode metal (EM) of the touch electrode (TE).

The positions of a plurality of color filters (CF) correspond to the positions of a plurality of touch electrodes (TE) or electrode metals (EM) constituting the plurality of touch electrodes (TE).

As described above, since the plurality of color filters (CF) is provided at the positions corresponding to the positions of a plurality of openings (OA), it is possible to improve the luminous performance of the display panel (DISP).

The vertical positional relationship between the plurality of color filters (CF) and the plurality of touch electrodes (TE) will be described below.

As shown in FIG. 11, the plurality of color filters (CF) and black matrixes (BM) can be provided on the plurality of touch electrodes (TE).

In this case, the plurality of color filters (CF) and black matrixes (BM) can be positioned on an overcoat layer (OC) arranged on the plurality of touch electrodes (TE). The overcoat layer (OC) can or need not be the same layer as the touch protection film (PAC) shown in FIG. 10.

As shown in FIG. 12, the plurality of color filters (CF) and black matrixes (BM) can be provided under the plurality of touch electrodes (TE).

In this case, the plurality of touch electrodes (TE) can be positioned on the overcoat layer (OC) on the plurality of color filters (CF) and black matrixes (BM). The overcoat layer (OC) can or need not be the same layer as the touch buffer film (T-BUF) or the touch insulating film (ILD) in FIG. 10.

The display panel (DISP) capable of touch sensing can be easily realized by arranging the touch electrodes (TE) on the encapsulation portion (ENCAP) as described above. However, the parasitic capacitance caused by the display electrode positioned under the encapsulation portion (ENCAP) can affect the touch sensing.

In particular, as the thickness of the display panel (DISP) decreases, the distance between the touch electrode (TE) and the display electrode is reduced, so that the parasitic capacitance therebetween can be increased. This parasitic capacitance can affect a signal applied to or detected from the touch electrode (TE).

For example, a signal applied to the touch electrode (TE) can be delayed or a signal detected from the touch electrode (TE) can contain noise due to the parasitic capacitance between the touch electrode (TE) and the second electrode (E2) arranged closest thereto.

Figure 13:
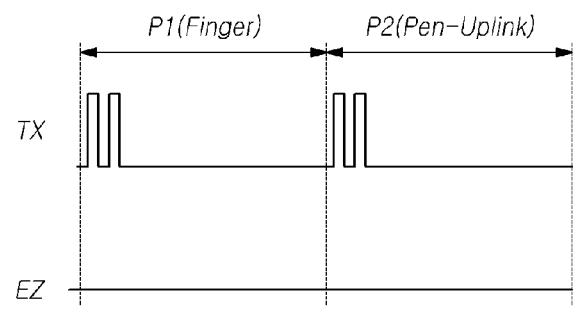
FIG. 13 is a view illustrating an example of timing and signals for performing finger-touch sensing and pen-touch sensing by a touch display device according to embodiments of the present disclosure.

FIG. 13 is a view illustrating an example of timing and signals for performing finger-touch sensing and pen-touch sensing in a touch display device 100 according to embodiments of the present disclosure.

Referring to FIG. 13, the touch driving circuit (TDC) of a touch display device 100 according to embodiments of the present disclosure can apply a first touch-driving signal to at least some of a plurality of touch electrodes (TE) during a first touch-driving period (P1) for sensing a finger touch.

In addition, the touch driving circuit (TDC) can apply a second touch-driving signal to at least some of the plurality of touch electrodes (TE) during a second touch-driving period (P2) for sensing a pen touch. The second touch-driving period (P2) can be a period in which the display panel (DISP) transmits an uplink signal to the pen.

A constant voltage can be applied to the touch electrode (TE) and the second electrode (E2) located below the same during the first touch-driving period (P1) and the second touch-driving period (P2).

As the voltage difference between the touch electrode (TE) and the second electrode (E2) is generated as described above, parasitic capacitance can be produced between the touch electrode (TE) and the second electrode (E2). In addition, this parasitic capacitance can cause a delay in the signal applied to the touch electrode (TE) or noise in the signal detected from the touch electrode (TE).

In particular, an uplink signal for pen-touch sensing can be delayed due to the parasitic capacitance, and if the uplink signal is delayed, the pen need not recognize the uplink signal transmitted by the display panel (DISP).

The embodiments of the present disclosure provide a method for preventing the delay of the uplink signal due to the parasitic capacitance and improving the performance of pen-touch sensing.

Figure 14:
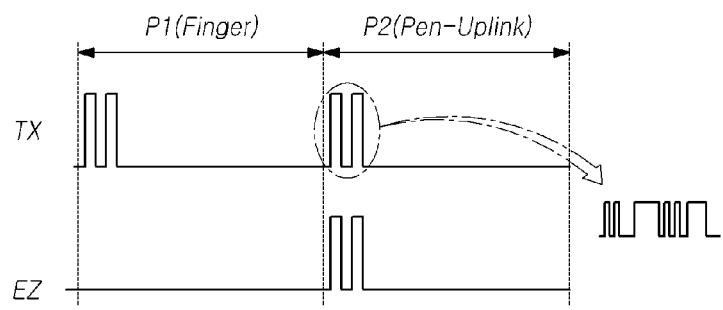
FIG. 14 is a view illustrating another example of timing and signals for performing finger-touch sensing and pen-touch sensing by a touch display device according to embodiments of the present disclosure.

FIG. 14 is a view illustrating another example of timing and signals for performing finger-touch sensing and pen-touch sensing in a touch display device 100 according to embodiments of the present disclosure.

Referring to FIG. 14, the touch driving circuit (TDC) of a touch display device 100 according to embodiments of the present disclosure outputs a first touch-driving signal to at least some of a plurality of touch electrodes (TE) during a first touch-driving period (P1) for sensing a finger touch. The touch electrode (TE) to which the first touch-driving signal is applied can be a TX touch electrode serving as a driving touch electrode.

In addition, a constant voltage can be applied to the second electrode (E2) located below the touch electrode (TE) during the first touch-driving period (P1).

The touch driving circuit (TDC) can apply a second touch-driving signal to at least some of the plurality of touch electrodes (TE) during a second touch-driving period (P2) in which an uplink signal is transmitted for pen-touch sensing.

The touch electrode (TE) to which the second touch-driving signal is applied can be a TX touch electrode serving as a driving touch electrode. Alternatively, the touch electrode (TE) can be an RX touch electrode serving as a sensing touch electrode.

That is, since the uplink signal transmission period for pen-touch sensing is not a period for detecting a signal caused by a pen touch, the second touch-driving signal can be applied to at least some of the TX touch electrodes and the RX touch electrodes so that the uplink signal is transmitted.

In addition, the second touch-driving signal applied to the touch electrode (TE) during the second touch-driving period (P2) can be an aperiodic pulse-type signal. The uplink signal can be transmitted in the form of an aperiodic pulse because the uplink signal includes information (e.g., panel status information, driving period information, timing information, and the like) transmitted from the display panel (DISP) to the pen. Aperiodic pulse-type signal can refer to a non-periodic pulse-type signal or a pulse-type signal that is without regular periodicity.

Further, during the second touch-driving period (P2), the second electrode (E2), positioned below the touch electrode (TE), can be applied with a signal corresponding to the second touch-driving signal applied to the touch electrode (TE).

The signal corresponding to the second touch-driving signal can have at least one of a frequency, a phase, and an amplitude corresponding to the frequency, the phase, and the amplitude of the second touch-driving signal.

For example, a signal having the same frequency and phase as the frequency and phase of the second touch-driving signal can be applied to the second electrode (E2) during the second touch-driving period (P2). Accordingly, the parasitic capacitance between the touch electrode (TE) and the second electrode (E2) can be reduced.

Alternatively, a signal having the same frequency, phase, and amplitude as the frequency, phase, and amplitude of the second touch-driving signal can be applied to the second electrode (E2) during the second touch-driving period (P2).

Accordingly, the touch electrode (TE) and the second electrode (E2) can be driven in the same phase and potential state, thereby eliminating the parasitic capacitance between the touch electrode (TE) and the second electrode (E2).

Therefore, it is possible to prevent the uplink signal, transmitted to the pen by the second touch-driving signal applied to the touch electrode (TE) during the second touch-driving period (P2), from being delayed due to parasitic capacitance.

In addition, it is possible to improve the uplink signal recognition rate of the pen and to enhance the performance of pen-touch sensing by preventing the delay of the uplink signal transmitted from the display panel (DISP) to the pen.

Figure 15:
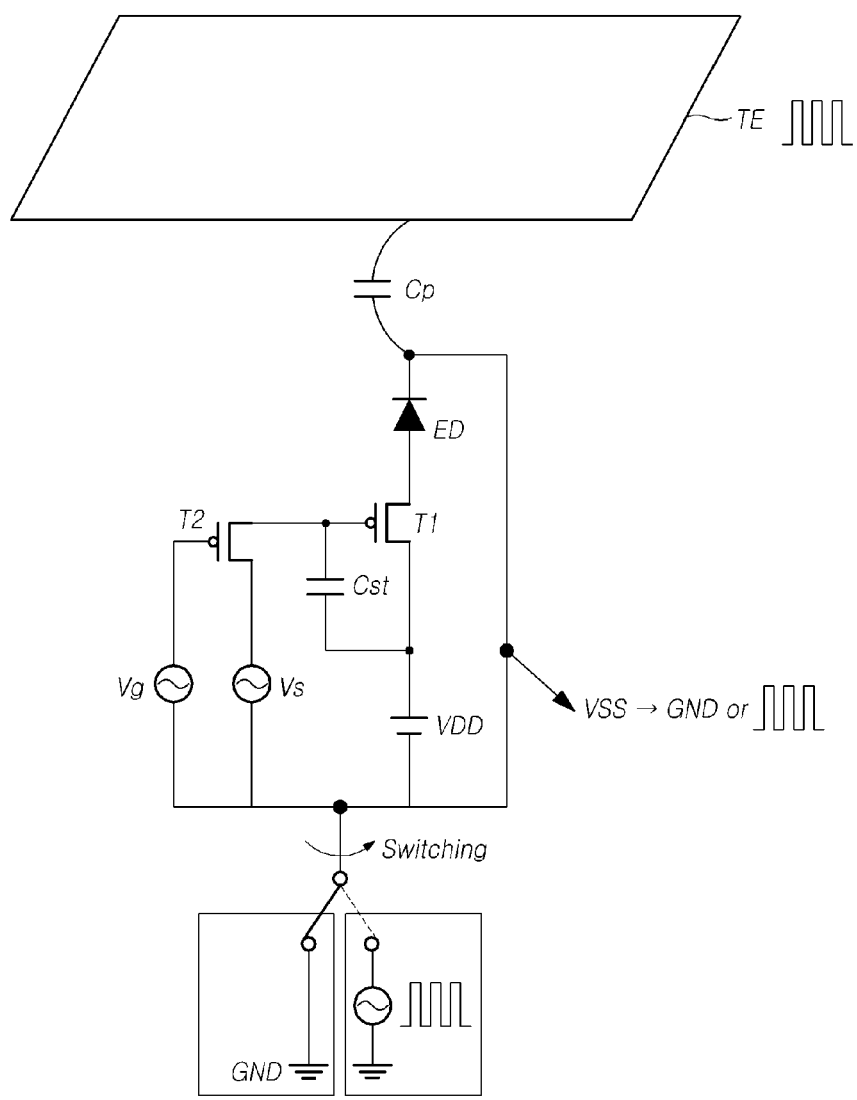
FIG. 15 is a view illustrating an example of a driving method of a touch display device that performs touch sensing according to the timing and signals shown in FIG. 14.

FIG. 15 is a view illustrating an example of a driving method of a touch display device 100 that performs touch sensing according to the timing and signals shown in FIG. 14.

Referring to FIG. 15, in the touch display device 100 according to embodiments of the present disclosure, the second electrode (E2) positioned under the touch electrode (TE) can be a cathode electrode of a light-emitting device (ED) arranged in each subpixel (SP). In addition, the cathode electrode can be connected to a line to which a base voltage (VSS) is applied.

The line to which the base voltage (VSS) is applied can be connected to the ground (GND) of the display panel (DISP). In addition, a signal corresponding to the second touch-driving signal can be applied by switching operation to the line to which the base voltage (VSS) is applied.

That is, the line for supplying a voltage to the second electrode (E2), serving as a cathode electrode, can be electrically connected to the ground (GND), or can be electrically connected to a circuit for supplying a signal corresponding to the second touch-driving signal.

In addition, the circuit for supplying a signal corresponding to the second touch-driving signal can be the touch driving circuit (TDC) or a separately provided circuit.

As described above, because the line for supplying a voltage to the second electrode (E2) can switch between the ground (GND) and the circuit for supplying a signal corresponding to the second touch-driving signal, it is possible to perform control such that the voltage state of the second electrode (E2) is the same as that of the touch electrode (TE) depending on the touch-driving period.

More specifically, during a first touch-driving period (P1), a first touch-driving signal is applied to the touch electrode (TE), and the line for supplying a voltage to the second electrode (E2) is electrically connected to the ground (GND).

In addition, during a second touch-driving period (P2), a second touch-driving signal can be applied to the touch electrode (TE), and the line for supplying a voltage to the second electrode (E2) can be electrically connected to a circuit for supplying a signal corresponding to the second touch-driving signal.

Accordingly, since a signal corresponding to the second touch-driving signal is applied to the second electrode (E2) during the second touch-driving period (P2), the parasitic capacitance (Cp) between the touch electrode (TE) and the second electrode (E2) can be reduced or eliminated.

As described above, it is possible to prevent the delay of the uplink signal transmitted from the display panel (DISP) to the pen during the second touch-driving period (P2) by reducing or eliminating the parasitic capacitance between the touch electrode (TE) and the second electrode (E2) during the second touch-driving period (P2).

In addition, a ground (GND) voltage is applied to the second electrode (E2) during the first touch-driving period (P1) so that the display can be driven in the touch-driving period.

Figure 16:
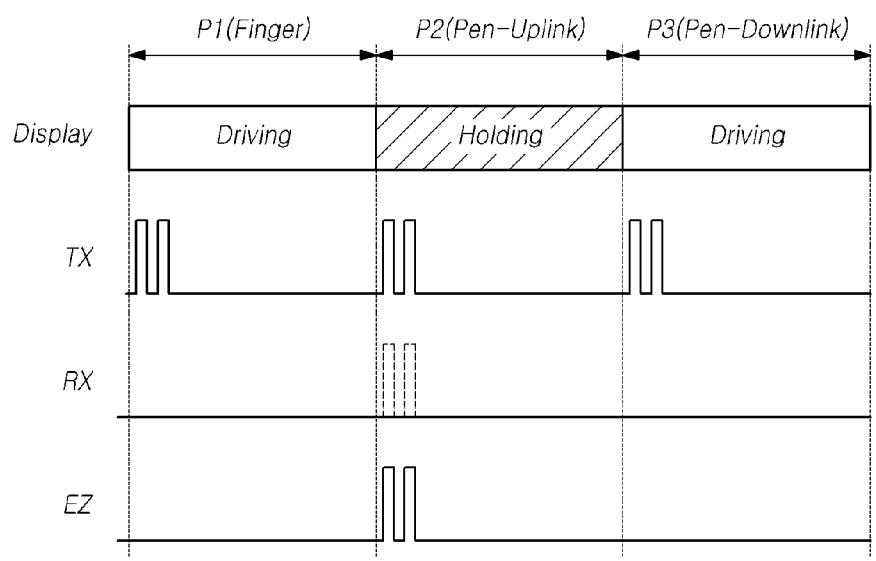
FIG. 16 is a view illustrating another example of timing and signals for performing finger-touch sensing and pen-touch sensing by a touch display device according to embodiments of the present disclosure.

FIG. 16 is a view illustrating another example of timing and signals for performing finger-touch sensing and pen-touch sensing in a touch display device 100 according to embodiments of the present disclosure.

Referring to FIG. 16, the touch driving circuit (TDC) of a touch display device 100 according to embodiments of the present disclosure applies a first touch-driving signal to the TX touch electrode during the first touch-driving period (P1). The first touch-driving signal can be a periodic pulse signal or a periodic pulse-type signal. In addition, the RX touch electrode is controlled so as to be in the constant voltage state during the first touch-driving period (P1).

Accordingly, if a finger touch of the user occurs on the display panel (DISP), a mutual-capacitance change between the TX touch electrode and the RX touch electrode can be detected to thus recognize the finger touch of the user on the display panel (DISP).

In addition, a constant voltage (for example, a ground voltage) is applied to the second electrode (E2), which is located below the touch electrode (TE) during the first touch-driving period (P1).

Since a constant voltage is applied to the second electrode (E2), which is a cathode electrode of the light-emitting device (ED) arranged in the subpixel (SP), it is possible to drive the display during the first touch-driving period (P1) for finger-touch sensing.

The touch driving circuit (TDC) applies a second touch-driving signal to the TX touch electrode during a second touch-driving period (P2) in which an uplink signal is transmitted for pen-touch sensing. Alternatively, the second touch-driving signal can be applied to the RX touch electrode during the second touch-driving period (P2). In addition, the second touch-driving signal can be applied to the TX touch electrode and the RX touch electrode, thereby improving the transmission performance of the uplink signal.

During the above second touch-driving period (P2), the touch display device 100 can stop the display driving, and can apply a signal corresponding to the second touch-driving signal to the second electrode (E2).

Since the display driving is stopped, the supply of a data voltage (VDATA) to the data line can be stopped, or the supply of a scan signal to the gate line can be stopped during the second touch-driving period (P2).

Since the signal corresponding to the second touch-driving signal applied to the touch electrode (TE) is applied to the second electrode (E2) during the second touch-driving period (P2), it is possible to reduce or eliminate the parasitic capacitance between the touch electrode (TE) and the second electrode (E2).

Accordingly, it is possible to prevent the delay of the uplink signal transmitted by the display panel (DISP) due to the parasitic capacitance between the touch electrode (TE) and the second electrode (E2) and to improve the performance of pen-touch sensing.

The touch driving circuit (TDC) outputs a third touch-driving signal to the TX touch electrode during a third touch-driving period (P3). In addition, the RX touch electrode is controlled so as to be in a constant voltage state.

In addition, a constant voltage is applied to the second electrode (E2) during the third touch-driving period (P3).

Therefore, the display is driven during the third touch-driving period (P3), thereby receiving a signal transmitted from the pen. Further, it is possible to detect pen information, whether or not a pen touch is performed, and the position thereof through a downlink signal transmitted from the pen.

As described above, the display driving is performed by applying a constant voltage to the second electrode (E2) during the first touch-driving period (P1) and the third touch-driving period (P3), thereby sensing a finger touch or a pen touch.

In addition, it is possible to prevent the transmission delay of the uplink signal and to thus improve the uplink signal recognition rate of the pen by stopping the display driving and applying a signal corresponding to the second touch-driving signal to the second electrode (E2) during the second touch-driving period (P2).

Figure 17:
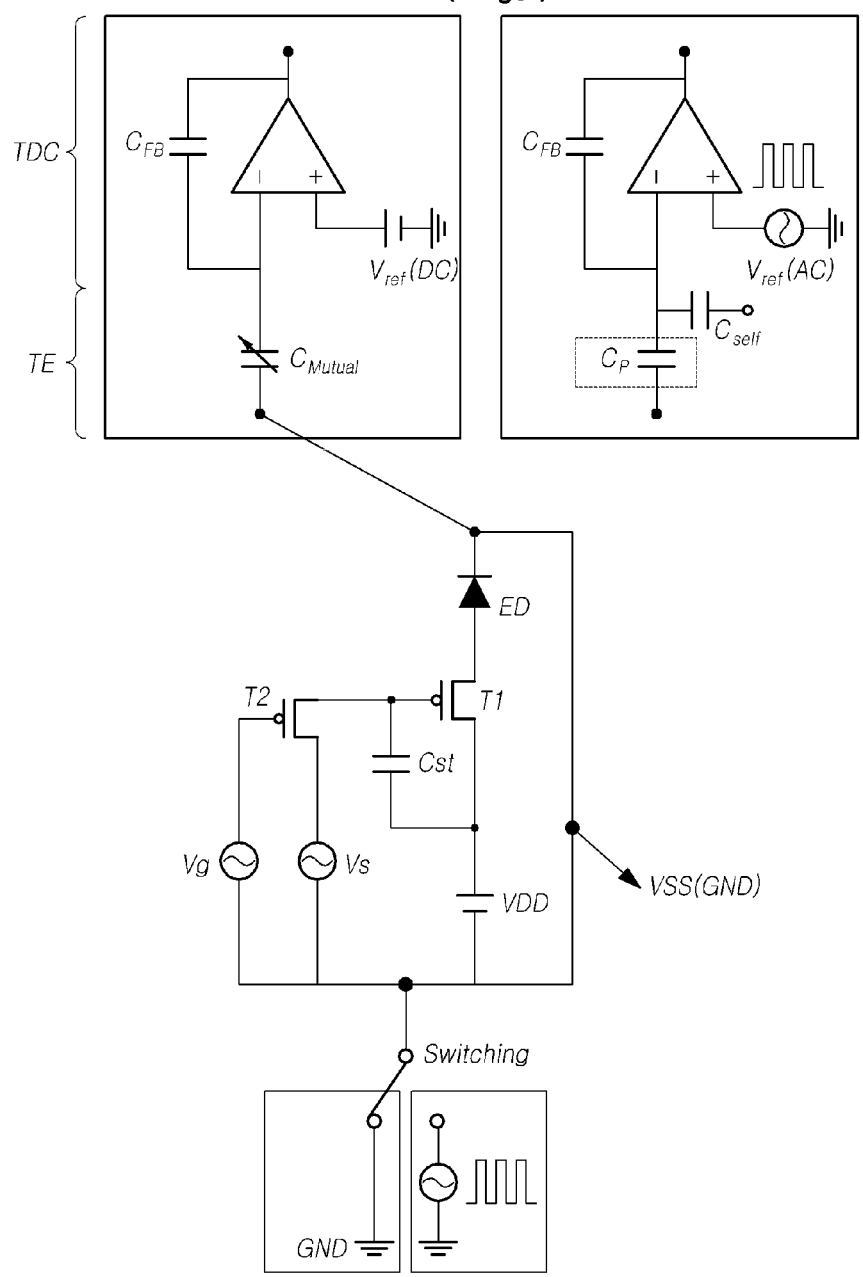
FIGS. 17 to 19 are views illustrating examples of a driving method of a touch display device that performs touch sensing according to the timing and signals shown in FIG. 16.
Figure 18:
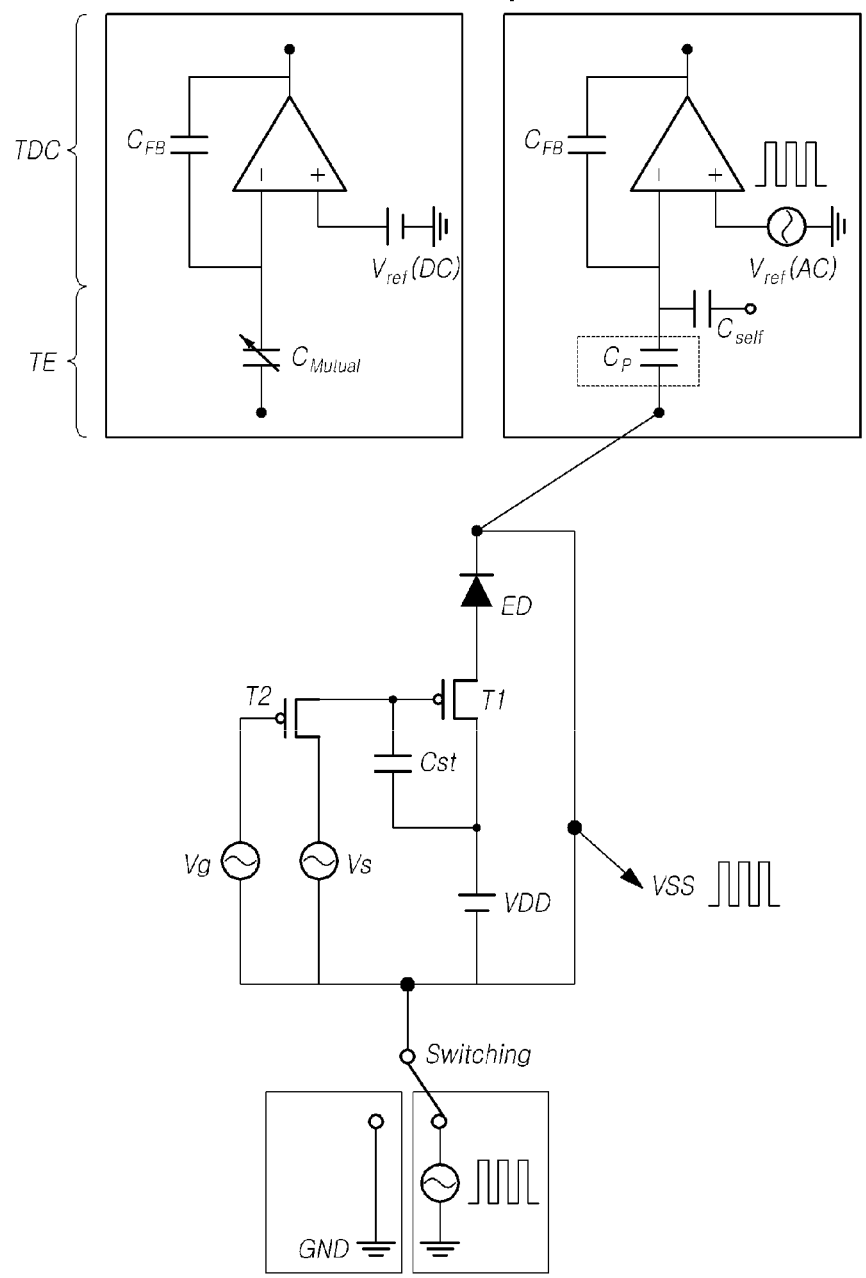
Figure 19:
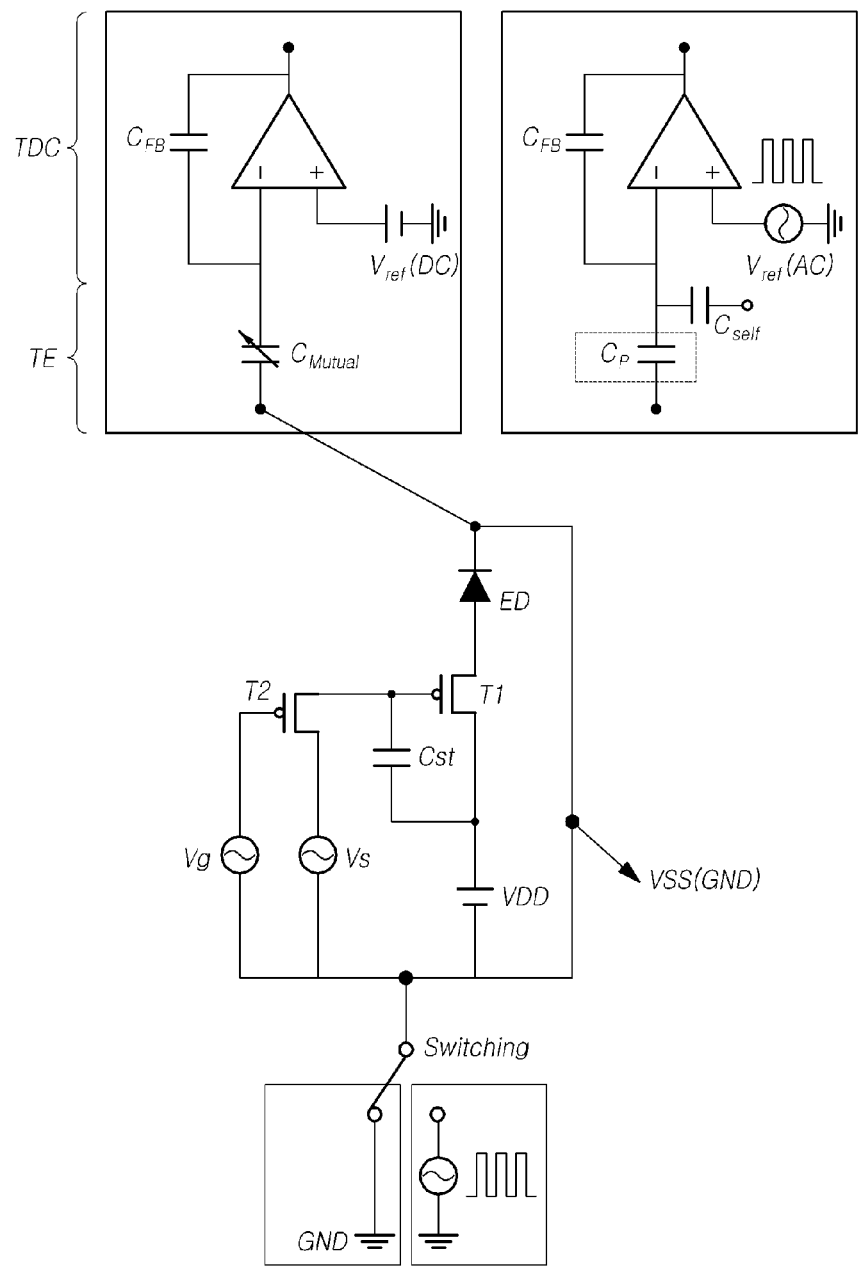

FIGS. 17 to 19 are views illustrating examples of a driving method of a touch display device 100 that performs touch sensing according to the timing and signals shown in FIG. 16.

FIG. 17 shows an example of a voltage applied to the second electrode (E2) and driving of the touch driving circuit (TDC) during the first touch-driving period (P1) in which finger-touch sensing is performed, and particularly shows an example of a circuit portion connected to the RX touch electrode in the touch driving circuit (TDC).

The touch driving circuit (TDC) outputs a first touch-driving signal to the TX touch electrode and performs control so as to apply a reference voltage ($V_{ref}$) for touch sensing to the RX touch electrode during the first touch-driving period (P1).

Therefore, a change in the mutual capacitance ($C_{Mutual}$) between the TX touch electrode and the RX touch electrode can be detected through a feedback capacitor ($C_{FB}$) and an operational amplifier, and a finger touch can be detected through the detected change of the capacitance.

In addition, a line for supplying a voltage to the second electrode (E2) during the first touch-driving period (P1) can be electrically connected to the ground (GND) of the display panel (DISP).

Accordingly, a constant voltage can be applied to the second electrode (E2), which is a cathode electrode of the light-emitting device (ED) arranged in the subpixel (SP), thereby driving the display.

FIG. 18 shows an example of a voltage applied to the second electrode (E2) and driving of the touch driving circuit (TDC) during the second touch-driving period (P2) in which an uplink signal is transmitted to the pen.

The touch driving circuit (TDC) outputs a second touch-driving signal to at least some touch electrodes (TE) of the TX touch electrodes and the RX touch electrodes during the second touch-driving period (P2). Therefore, an AC voltage can be applied to the (+) input terminal of an operational amplifier included in the touch driving circuit (TDC).

In addition, as the second touch-driving signal is applied to the TX touch electrode or the RX touch electrode, the display panel (DISP) can transmit an uplink signal to the pen.

A line for supplying a voltage to the second electrode (E2) during the second touch-driving period (P2) can be electrically connected to a circuit for supplying a signal corresponding to the second touch-driving signal.

Therefore, the second electrode (E2) can be in a voltage state corresponding to the touch electrode (TE) during the second touch-driving period (P2), and can be in the state in which a voltage having the same phase and level as the touch electrode (TE) is applied.

Since the second electrode (E2) is driven using the same phase and potential as the touch electrode (TE), as described above, the parasitic capacitance (Cp) generated between the second electrode (E2) and the touch electrode (TE) can be eliminated.

The delay of the uplink signal transmitted by the display panel (DISP) can be prevented by eliminating the parasitic capacitance, thereby increasing the transmission rate of the uplink signal.

FIG. 19 shows an example of a voltage applied to the second electrode (E2) and driving of the touch driving circuit (TDC) during the third touch-driving period (P3) in which a downlink signal is received from the pen.

The touch driving circuit (TDC) outputs a third touch-driving signal to the TX touch electrode during the third touch-driving period (P3) and allows a constant voltage to be applied to the RX touch electrode so as to detect a change in the mutual capacitance ($C_{Mutual}$) with the TX touch electrode.

In addition, a line for supplying a voltage to the second electrode (E2) is allowed to be electrically connected to the display panel (DISP).

Accordingly, the display panel (DISP) can perform display driving, and can receive a downlink signal transmitted from the pen, thereby sensing a pen touch on the display panel (DISP).

As described above, according to the embodiments of the present disclosure, it is possible to perform control such that the second electrode (E2) positioned under the touch electrode (TE) is in a constant voltage state or is in the state in which a signal corresponding to the touch-driving signal is applied depending on the touch-driving period.

As a result, the touch sensing can be performed at the same time as the display driving, and the uplink signal transmitted from the display panel (DISP) to the pen can be prevented from being delayed.

Figure 20:
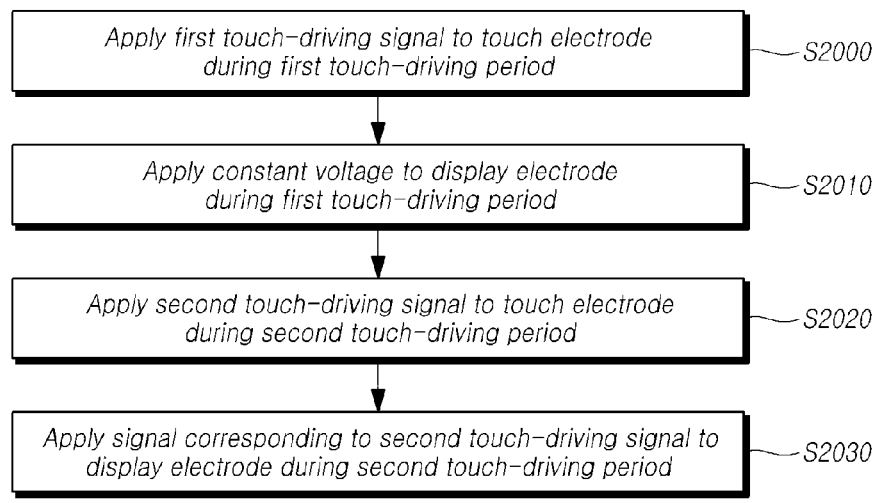
FIG. 20 is a view illustrating an example of a driving method of a touch display device according to embodiments of the present disclosure.

FIG. 20 is a view illustrating an example of a driving method of a touch display device 100 according to embodiments of the present disclosure.

Referring to FIG. 20, the touch display device 100 applies a first touch-driving signal to a touch electrode (TE) during a first touch-driving period (P1) for sensing a finger touch (S2000).

Then, a constant voltage is applied to a display electrode (cathode electrode) arranged below the touch electrode (TE) during the first touch-driving period (P1) (S2010).

Accordingly, display driving is performed during the first touch-driving period (P1), thereby sensing a finger touch of the user on the display panel (DISP).

The touch display device 100 applies a second touch-driving signal to the touch electrode (TE) during a second touch-driving period (P2) in which an uplink signal is transmitted to the pen (S2020).

Then, a signal corresponding to the second touch-driving signal is applied to the display electrode arranged below the touch electrode (TE) during the second touch-driving period (P2) (S2030).

Accordingly, the parasitic capacitance folioed between the touch electrode (TE) and the display electrode can be eliminated, thereby preventing the transmission delay of the uplink signal and improving the performance of pen-touch sensing.

According to the embodiments of the present disclosure described above, the cathode electrode positioned adjacent to the touch electrode (TE) can be connected to the ground (GND) of the display panel (DISP), or can be connected to a circuit for supplying a signal corresponding to the touch-driving signal depending on the touch-driving period.

In addition, a signal corresponding to the touch-driving signal applied to the touch electrode (TE) can be applied to the cathode electrode during the period in which the display panel (DISP) transmits an uplink signal to the pen, thereby eliminating the parasitic capacitance between the touch electrode (TE) and the cathode electrode.

Therefore, it is possible to prevent the transmission delay of the uplink signal due to the parasitic capacitance and to improve the transmission rate of the uplink signal, thereby enhancing the performance of pen-touch sensing.

Furthermore, the cathode electrode is controlled so as to be connected to the ground (GND) during the touch-driving period for sensing a finger touch or a pen touch, thereby performing the display driving and sensing a touch with respect to the display panel (DISP).

According to the embodiments of the present disclosure described above, a touch display device can include a substrate having an active area and a non-active area; a plurality of gate lines, a plurality of data lines, and a plurality of subpixels arranged on the substrate, wherein each of the plurality of subpixels includes a first electrode, an organic light emitting layer on the first electrode, and a second electrode on the organic light emitting layer; an encapsulation layer on the second electrode; a plurality of touch electrodes on the encapsulation layer; a plurality of touch routing lines electrically connected to the plurality of touch electrodes, wherein the plurality of touch routing lines are disposed along an inclined surface of the encapsulation layer, and an electrically connected to a plurality of touch pads disposed in the non-active area; and a touch driving circuit configured to drive the plurality of touch electrodes, wherein the touch driving circuit outputs a first touch-driving signal during a first touch-driving period, and a second touch-driving signal during a second touch-driving period to at least some of the plurality of touch electrodes, and wherein the second electrode is applied with a constant voltage during the first touch-driving period and is applied with a signal corresponding to the second touch-driving signal during the second touch-driving period.

According to the embodiments of the present disclosure described above, a method of driving a touch display device can include applying a first touch-driving signal to at least some of a plurality of touch electrodes and a constant voltage to a display electrode during a first touch-driving period; and applying a second touch-driving signal to at least some of the plurality of touch electrodes and a signal corresponding to the second touch-driving signal to the display electrode during a second touch-driving period.

Although example embodiments of the present disclosure have been described for illustrative purposes, those skilled in the art will appreciate that various modifications, additions and substitutions are possible, without departing from the scope and spirit of the disclosure as disclosed in the accompanying claims. Therefore, example embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A touch display device comprising:
a substrate having an active area and a non-active area;
a plurality of gate lines, a plurality of data lines, and a plurality of subpixels arranged on the substrate, wherein each of the plurality of subpixels includes a first electrode, an organic light emitting layer on the first electrode, and a second electrode on the organic light emitting layer;
an encapsulation layer on the second electrode;
a plurality of touch electrodes on the encapsulation layer;
a plurality of touch routing lines electrically connected to the plurality of touch electrodes, wherein the plurality of touch routing lines are disposed along an inclined surface of the encapsulation layer, and electrically connected to a plurality of touch pads disposed in the non-active area; and
a touch driving circuit configured to drive the plurality of touch electrodes,
wherein the touch driving circuit outputs a first touch-driving signal during a first touch-driving period to at least some of the plurality of touch electrodes, and a second touch-driving signal during a second touch-driving period to the at least some of the plurality of touch electrodes,
wherein the second touch-driving period is a different period from the first touch-driving period, and
wherein the second electrode is applied with a constant voltage during the first touch-driving period, and the second electrode is applied with a signal corresponding to the second touch-driving signal during the second touch-driving period, and the signal corresponding to the second touch-driving signal is different from the constant voltage.

2. The touch display device of claim 1, wherein a data voltage is supplied to at least some of the plurality of data lines during the first touch-driving period, and the supply of the data voltage is stopped during the second touch-driving period.

3. The touch display device of claim 1, wherein the signal applied to the second electrode during the second touch-driving period is a signal corresponding to at least one of a frequency, a phase, and an amplitude of the second touch-driving signal.

4. The touch display device of claim 1, wherein the first touch-driving signal and the second touch-driving signal are pulse-type signals, and
wherein the first touch-driving signal is a periodic pulse signal and the second touch-driving signal is an aperiodic pulse signal.

5. The touch display device of claim 1, wherein the touch driving circuit outputs a third touch-driving signal to at least some of the plurality of touch electrodes during a third touch-driving period and detects a touch-sensing signal from at least some of the plurality of touch electrodes during at least one of the first touch-driving period and the third touch-driving period.

6. The touch display device of claim 5, wherein a constant voltage is applied to the second electrode during the third touch driving period.

7. The touch display device of claim 5, wherein the touch driving circuit is configured to sense a finger touch during the first touch-driving period, and sense a pen touch during the third touch-driving period.

8. The touch display device of claim 1, wherein the plurality of touch electrodes comprise a plurality of first touch electrodes connected to each other in a first direction and a plurality of second touch electrodes connected to each other in a second direction intersecting the first direction, and
wherein the second touch-driving signal is applied to at least some of the plurality of first touch electrodes and the plurality of second touch electrodes during the second touch-driving period.

9. The touch display device of claim 5, wherein during the second touch-driving period, an uplink signal is transmitted from at least one touch electrode of the plurality of touch electrodes to a pen, and during the third touch-driving period, a downlink signal transmitted from the pen to the at least one touch electrode.

10. The touch display device of claim 1, further comprising a base voltage line electrically connected to the second electrode so as to be applied with a ground signal during the first touch-driving period and so as to be applied with a signal corresponding to the second touch-driving signal during the second touch-driving period.

11. The touch display device of claim 10, wherein the base voltage line is electrically connected to a ground arranged on the substrate during the first touch-driving period and is electrically separated from the ground during the second touch-driving period.

12. The touch display device of claim 1, wherein the first touch-driving signal is different from the constant voltage during the first touch-driving period, and the second touch-driving signal is the same as the signal during the second touch-driving period.

13. The touch display device of claim 1, wherein each of the plurality of touch electrodes is a mesh type including an open area, and the open area positionally corresponds to a light emitting region of the plurality of subpixels.

14. The touch display device of claim 1, wherein at least two touch electrodes of the plurality of touch electrodes are connected by a connection line formed on a different level layer from the at least two touch electrodes,
wherein at least one routing line of the plurality of routing lines includes multiple layers including a first layer and a second layer,
wherein the first layer is a same level layer with the connection line, and
wherein the second layer is a same level layer with the plurality of touch electrodes.

15. A method of driving a touch display device, the method comprising:
applying a first touch-driving signal to at least some of a plurality of touch electrodes and a constant voltage to a display electrode during a first touch-driving period; and
applying a second touch-driving signal to the at least some of the plurality of touch electrodes and a signal corresponding to the second touch-driving signal to the display electrode during a second touch-driving period,
wherein the second touch-driving period is a different period from the first touch-driving period, and the signal corresponding to the second touch-driving signal is different from the constant voltage.

16. The method of claim 15, further comprising performing a display driving during the first touch-driving period and stopping the display driving during the second touch-driving period.

17. The method of claim 15, wherein the signal applied to the display electrode during the second touch-driving period is a signal corresponding to at least one of a frequency, a phase, and an amplitude of the second touch-driving signal.

18. The method of claim 15, wherein the display electrode is an electrode arranged closest to the plurality of touch electrodes, among the electrodes to which a voltage is applied for display driving.

19. The method of claim 15, wherein the first touch-driving signal is different from the constant voltage during the first touch-driving period, and the second touch-driving signal is the same as the signal during the second touch-driving period.

20. A touch display device comprising:
a panel configured to display an image, the panel including a plurality of touch electrodes, and a display electrode embedded in the panel and positioned below the plurality of touch electrodes; and
a touch driving circuit configured to drive the plurality of touch electrodes,
wherein during a first touch-driving period, at least some of the plurality of touch electrodes receives a first touch-driving signal and the display electrode receives a constant voltage,
wherein during a second touch-driving period, the at least some of the plurality of touch electrodes receives a second touch-driving signal and the display electrode receives the second touch-driving signal,
wherein the first touch-driving signal is different from the constant voltage, and the second touch-driving signal is different from the constant voltage, and
wherein the second touch-driving period is a different period from the first touch-driving period.

21. The touch display device of claim 20, further comprising a third touch-driving period after the second touch-driving period, wherein the touch driving circuit is configured to sense a finger touch during the first touch-driving period, and sense a pen touch during the third touch-driving period.

22. The touch display device of claim 21, wherein during the second touch-driving period, an uplink signal is transmitted from at least one touch electrode of the plurality of touch electrodes to a pen, and during the third touch-driving period, a downlink signal transmitted from the pen to the at least one touch electrode.

* * * * *